United States Patent
Colyn et al.

(10) Patent No.: US 12,546,359 B2
(45) Date of Patent: Feb. 10, 2026

(54) SEALED FASTENER CAP AND RELATED METHOD OF MANUFACTURE

(71) Applicant: National Nail Corp., Grand Rapids, MI (US)

(72) Inventors: Christopher M. Colyn, Grandville, MI (US); Todd E.A. Schwartzkopf, Hudsonville, MI (US); Roger A. Vandenberg, Hudsonville, MI (US)

(73) Assignee: National Nail Corp., Grand Rapids, MI (US)

( * ) Notice: Subject to any disclaimer, the term of this patent is extended or adjusted under 35 U.S.C. 154(b) by 0 days.

(21) Appl. No.: 19/021,704

(22) Filed: Jan. 15, 2025

(65) Prior Publication Data

US 2025/0154976 A1     May 15, 2025

Related U.S. Application Data

(62) Division of application No. 18/133,710, filed on Apr. 12, 2023, now Pat. No. 12,228,165, which is a division of application No. 17/718,926, filed on Apr. 12, 2022, now Pat. No. 11,674,544.

(60) Provisional application No. 63/177,128, filed on Apr. 20, 2021.

(51) Int. Cl.
*F16B 41/00*     (2006.01)
*B25C 7/00*      (2006.01)

(52) U.S. Cl.
CPC .............. *F16B 41/005* (2013.01); *B25C 7/00* (2013.01); *F16B 41/00* (2013.01)

(58) Field of Classification Search
CPC ........ F16B 33/004; F16B 37/04; F16B 39/10; F16B 37/14; F16B 39/24; F16B 41/00; F16B 41/005; F16B 43/00; F16B 43/001; Y10T 29/49948; Y10T 29/49947; Y10T 29/4995
USPC .... 411/337, 371.1–371.2, 372.5–372.6, 373, 411/442
See application file for complete search history.

(56) References Cited

U.S. PATENT DOCUMENTS

| | | |
|---|---|---|
| 2,439,516 A | 4/1948 | Holcomb |
| 2,927,495 A | 3/1960 | Barwood |
| 3,202,033 A | 8/1965 | Weidner, Jr. |
| 3,726,178 A | 4/1973 | Dimitry |
| 3,994,200 A | 11/1976 | Swanson |
| 4,191,389 A | 3/1980 | Jelinek |

(Continued)

*Primary Examiner* — Sarang Afzali
*Assistant Examiner* — Darrell C Ford
(74) *Attorney, Agent, or Firm* — Warner Norcross + Judd LLP

(57) ABSTRACT

A fastener cap system can include a rigid cap and a sealing member which forms a liquid barrier so moisture is impaired from entering a space under the rigid cap and/or around a fastener installed through it. The sealing member can include a central seal disposed on an upper surface of the cap, the seal extending beyond a head of a fastener, which extends through the cap and sealing member, so that moisture is impaired from entering the cap under the head. The sealing member can be above and below respective lowermost and uppermost cap surfaces so the cap system can be fed cleanly and efficiently through a cap feeder during installation via a tool. The sealing member, which can have a higher coefficient of friction than the rigid cap, thereby does not drag along a cap feeder and cause feeding issues. Related methods are provided.

20 Claims, 20 Drawing Sheets

(56) References Cited

U.S. PATENT DOCUMENTS

| | | |
|---|---|---|
| 4,744,187 A | 5/1988 | Tripp |
| 4,865,335 A | 9/1989 | McGann |
| 5,188,495 A | 2/1993 | Jones, Jr. |
| 5,524,907 A | 6/1996 | Walser |
| 5,788,445 A | 8/1998 | Huang |
| 7,077,611 B2 | 7/2006 | Metschke |
| 7,311,493 B2 | 12/2007 | Remy et al. |
| 7,516,841 B2 | 4/2009 | Uejima et al. |
| 7,850,410 B1 | 12/2010 | Curtis |
| 8,011,862 B2 | 9/2011 | Scott |
| 8,616,818 B2 | 12/2013 | Travis |
| 8,708,630 B1 | 4/2014 | Curtis et al. |
| 8,920,088 B1 | 12/2014 | Garvin |
| 8,931,989 B2 | 1/2015 | Stephan |
| 9,239,074 B2 | 1/2016 | Lauer et al. |
| 2003/0147722 A1 | 8/2003 | Rosenbaum |
| 2004/0118720 A1 | 6/2004 | Powers et al. |
| 2006/0002784 A1 | 1/2006 | Curtis |
| 2007/0292239 A1 | 12/2007 | Lin |
| 2011/0305540 A1 | 12/2011 | Litzinger |
| 2018/0172058 A1 | 6/2018 | Zimmerman et al. |
| 2019/0162225 A1 | 5/2019 | Etling et al. |
| 2020/0018336 A1* | 1/2020 | Buhager ............... B23P 19/04 |
| 2020/0094312 A1* | 3/2020 | Chan ..................... B21J 15/32 |
| 2021/0317862 A1 | 10/2021 | Gillis et al. |

\* cited by examiner

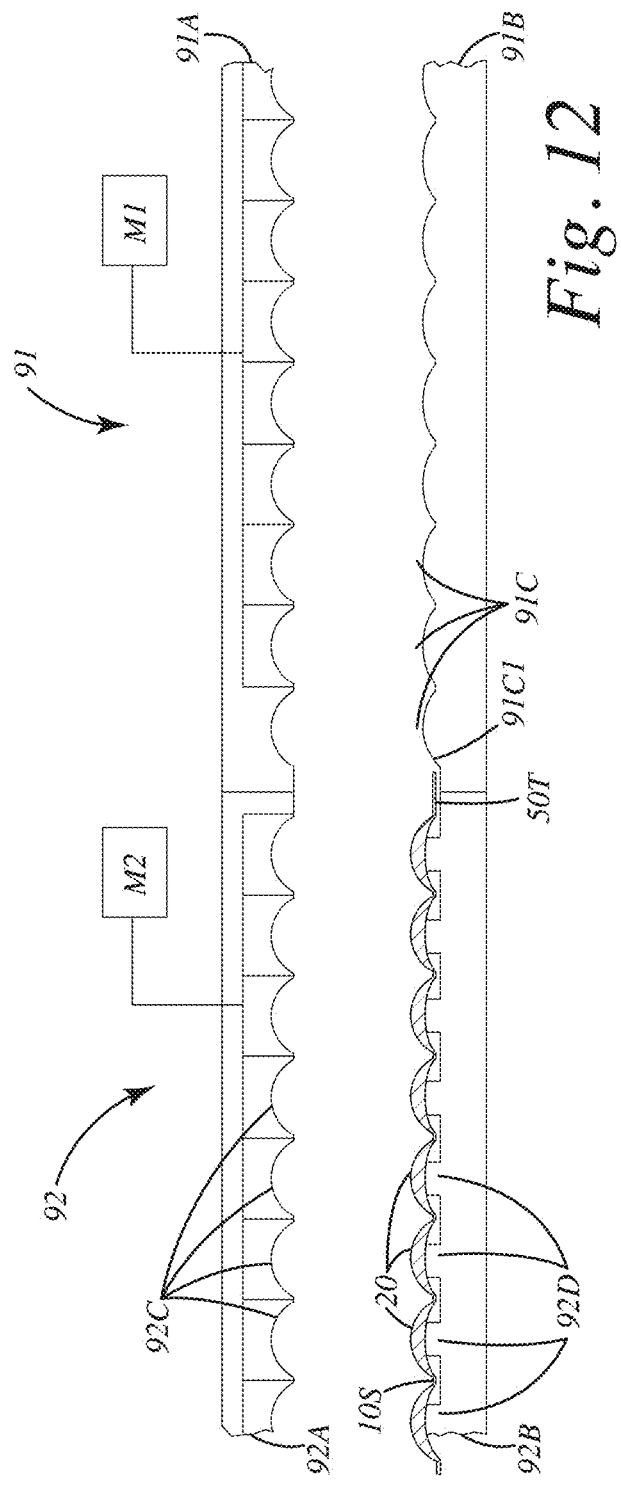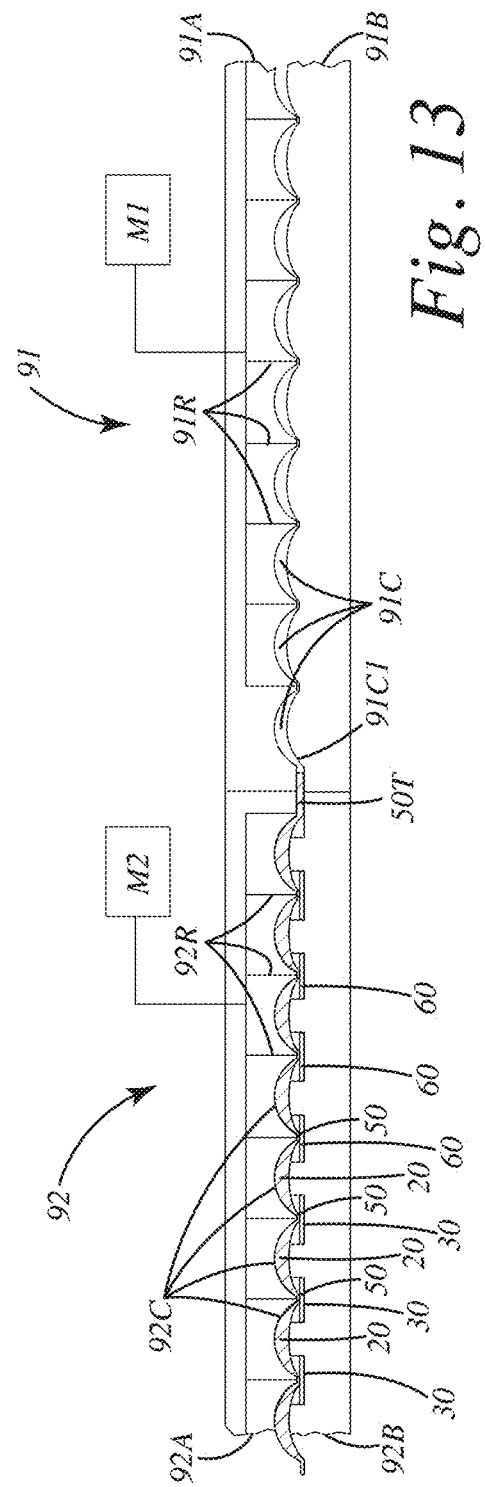

SEALED FASTENER CAP AND RELATED METHOD OF MANUFACTURE

BACKGROUND OF THE INVENTION

The present invention relates to fasteners, and more particularly to a fastener cap including a sealing system around a fastener to impair infiltration of moisture around the fastener and the cap.

In the construction industry, it is common to use a fastener cap to secure a panel, underlayment, roofing felt, or building wrap to a wood panel or other structure. For example, when a moisture and wind proofing building wrap is installed on a building, fastener caps are used to secure the sheets of the wrap to the structure. Each fastener cap has a nail or staple pierced through it, and the nail is driven into the underlying structure. When a roofing felt is installed on a roof of a building, fastener caps likewise are used to secure the felt in place before shingles or other roofing is installed.

There is a variety of fastener caps in the market, some of which are designed for nails, and others for staples. Some popular fastener caps used in the building industry are the STINGER® NailPac® units and STINGER® StaplePac® units, which are commercially available from National Nail Corp. of Grand Rapids, Michigan. Typically, to install the fastener cap, a staple or nail is projected through the cap, through the wrap, felt, or underlayment and into an underlying structure, which typically is constructed from wood. The nail or staple consequently makes a hole in the wrap, felt, or underlayment, as well as the underlying structure. As a result, moisture can enter under the cap, and enter that hole, sometimes with the cap acting as a wick for water or moisture to infiltrate the hole. The moisture can further travel through or under the wrap or felt, to the structure, which, if constructed from wood, can begin to rot. Moisture sometimes also can remain under the cap, creating an area prone to mold, mildew and/or fungus growth, which in turn can damage or compromise wrap, felt or underlayment, as well as the underlying structure if it reaches the same. Perhaps more significantly, moisture under the cap can result in fastener corrosion, which can lead to premature fastener failure. Although uncommon, these can void the value of having the fastener installed in the first instance, and can further create an easier point of liquid infiltration into the substrate.

To address the above issues, and attempt to prevent the moisture penetration issues, some manufacturers have attempted to place a seal around the fastener. As one example, some have used a flat rubber washer placed under the head of the fastener. While this can sometimes work, it also can trap the moisture under the head, and allow the rubber washer to act like a wick to draw moisture under the head and toward the shaft, ultimately toward the substrate. As another example, some have placed a rupture-able receptacle filled with a liquid sealant under a cap. When a nail pierces the cap and the receptacle, the liquid sealant leaks out from the receptacle around the nail and the hole produced by the nail, cures and then provides a seal. While this can be suitable sometimes, the receptacles can break before installation, producing a mess for later transfer and installation of the fastener caps. Further, when released, the liquid sealant can end up on tools, installer's hands, or on roof surfaces among other things.

Accordingly, there remains room for improvement in the field of sealing systems used in connection with fastener caps.

SUMMARY OF THE INVENTION

A fastener cap system is provided including a rigid cap and a sealing member configured to form a liquid barrier around the rigid cap and/or a fastener penetrating the rigid cap, whereby liquid and moisture is impaired from entering a space under the rigid cap and/or around the fastener.

In one embodiment, the fastener cap system includes a rigid cap and a sealing member having a seal rim at an outer rim of the cap, the seal rim engaging a substrate to form a first liquid barrier around the rigid cap so that moisture is impaired from entering a space under the rigid cap. The sealing member can include a central seal disc disposed over a central cap disc that extends beyond a head of a fastener, which extends through the cap and sealing member, so that moisture is impaired from infiltrating the cap under the head.

In another embodiment, the sealing member does not extend under the central cap disc to a shaft. In turn, this can impair wicking of moisture toward the fastener. The system can include a secondary seal ring between the seal rim and fastener to form a second liquid barrier under the rigid cap so that moisture is impaired from traveling toward the fastener.

In even another embodiment, the system can include the fastener that extends through the central seal disc and the central cap disc. The sealing member includes a secondary seal ring that extends downward from a lower cap surface of the rigid cap and surrounds the fastener. This secondary seal ring, however, can be distal from the fastener along the lower cap surface. A central void can be formed between the substrate and the lower cap surface under the central cap disc when the fastener and rigid cap are installed.

In still another embodiment, an outer void is formed between the substrate and the seal perimeter ring under the cap. The central void and the outer void can be separated from one another by the secondary seal ring.

In yet another embodiment, the cap can include an upper cap surface defining a recess centered on the central axis. The central seal disc can be disposed in the recess and directly joined with the central cap disc. The recess can be bounded by a recess wall that curves around the central axis. The central seal disc can include an outer seal disc wall that is disposed adjacent the recess wall.

In even another embodiment, the cap can include a first cap connector tab projecting outwardly from the cap rim, and a second cap connector tab projecting outwardly from the cap rim distal and opposite the first cap connector tab. These cap connector tabs can be configured to join adjacent caps in a strip of multiple caps. The cap connector tabs can be configured to flex, bend or articulate, all referred to as bend herein, so that the strip can be rolled upon itself about a roll axis. The cap connector tabs can be frangible or breakable so that a leading rigid cap can be separated from an adjacent cap in the strip when penetrated with a fastener.

In a further embodiment, the sealing member can include a first seal connector tab projecting outwardly from the seal rim. The first seal connector tab can be joined with the first cap connector tab. The sealing member can include a second seal connector tab projecting outwardly from the seal rim. The second seal connector tab can be joined with the second cap connector tab distal and opposite the first seal connector tab. These seal connector tabs also can bend, so that the strip can be rolled upon itself about a roll axis. The seal connector tabs also can be frangible or breakable so that a leading rigid cap can be separated from an adjacent cap in the strip when penetrated by a fastener.

In still a further embodiment, the rigid cap can define one or more passageways extending through the rigid cap from the upper cap surface to the lower cap surface. The central seal disc and the seal perimeter ring can be joined via one or more corresponding sprues extending through the one or more passageways. In this manner, the central seal disc, seal perimeter ring and one or more sprues form a one piece, monolithic unit.

In a further embodiment, a method is provided. The method can include forming multiple caps, each cap comprising a central cap disc extending to a cap perimeter flange, and a cap perimeter ring joined with the cap perimeter flange, the cap perimeter ring including a cap rim, each cap rim being joined with an adjacent cap rim of an adjacent rigid cap via a cap connector, optionally so that an elongated strip of caps is created; and joining multiple sealing members constructed from an elastomeric material with each respective cap, each sealing member comprising a central seal disc disposed over the central cap disc, the central seal disc having an upper seal dimension greater than a head dimension of a head of a fastener configured to extend through the rigid cap and the sealing member, a seal perimeter ring extending along the cap perimeter ring to a seal rim, the seal rim being disposed adjacent the cap rim and configured to engage a substrate and form a first liquid barrier around the rigid cap so that moisture is impaired from entering a first space under the rigid cap between the lower cap surface and the substrate.

In still a further embodiment, the method can include molding the rigid caps and the respective sealing members in a strip using a two shot process. The rigid caps can be molded first, then the sealing members can be molded to the cured rigid caps in another mold operation.

In still a further embodiment, the method can include introducing a flowable polymeric material into a mold to form the rigid caps in corresponding cap mold cavities, the cap cavities being coextensive with one another and joined with respective cap connector cavities, such that the molten polymeric material flows through the respective cap connector cavities; allowing the flowable polymeric material to cure to form the rigid caps, optionally with each of the rigid caps joined with an adjacent rigid cap via a respective cap connector; forming corresponding sealing member cavities adjacent each of the caps, optionally with the sealing member cavities being coextensive with one another and joined with respective seal connector cavities.

In yet a further embodiment, the method can include introducing the elastomeric material in flowable form into the sealing member cavities adjacent each of the rigid caps and optionally into the respective seal connector cavities adjacent respective cap connectors; allowing the elastomeric material to cure to form sealing members on respective ones of the rigid caps, optionally with each of the sealing members joined with an adjacent sealing member via a respective seal connector.

In even a further embodiment, the method can include coextruding a polymeric material to form the multiple caps and an elastomeric material to form the multiple sealing members joined with the caps disposed in a strip. In some applications, the elastomeric material need not extend through the core of the polymeric material that forms the cap. The co-extruded elastomeric material forming the multiple sealing members can be on the upper and lower surfaces of the polymeric cap material, with the rigid caps formed between the sealing members.

In another embodiment, the fastener cap system can include a rigid cap having uppermost and lowermost portions, and a sealing member. The sealing member can be associated with the cap so that the sealing member does not extend above or below the uppermost portion or the lower most portion of the rigid cap.

In still another embodiment, the sealing member can be elastomeric, and/or can include a higher static or dynamic coefficient of friction than the rigid cap, relative to a reference surface.

In yet another embodiment, the fastener cap system can comprise multiple individual fastener caps joined with one another in a strip. The strip of caps can be fed to an advancing station of an installation tool where the individual fastener caps can be sequentially penetrated by individual fasteners and installed relative to a substrate with respective fasteners. The tool can include a cap feeder relative to which the fastener caps can slide or otherwise move.

In even another embodiment, the sealing member can be recessed relative to the uppermost and/or lowermost portions of the rigid cap. Those uppermost and/or lowermost portions of the cap can engage and slide easily relative to reference surfaces of a cap feeder of the installation tool. The sealing member, which can have a greater coefficient of friction than the rigid cap, relative to the reference surface, can be out of contact with the feeder or guide, and thus does not impair the sliding or other movement of the cap relative to the components of the cap feeder.

In a further embodiment, the rigid cap can include a lower rim and an upper flange ring. A sealing member can be disposed adjacent the lower rim or cap rim, but closer to a longitudinal axis than the rim. The sealing member can be spaced a distance above the rim, so that when the cap is placed on a reference surface before installation, the rim contacts the surface, but the sealing member does not.

In still a further embodiment, the rigid cap can include a lower rim and an upper flange ring. A sealing member can be disposed adjacent the upper flange ring or cap perimeter flange, but closer to a longitudinal axis than the flange. The sealing member can be spaced a distance below the flange, so that when the cap is placed upside down on a reference surface before installation, the cap perimeter flange contacts the surface, but the sealing member does not.

In yet a further embodiment, the rigid cap can include a lower rim or cap rim and an upper flange ring or cap perimeter flange. A first sealing member can be disposed adjacent the upper flange ring or the cap perimeter flange, but closer to a longitudinal axis than the cap perimeter flange. The first sealing member can be spaced a distance below or recessed relative to the cap perimeter flange, or an uppermost part of the cap, so that when the cap is placed upside down on a reference surface before installation, the uppermost portion of the cap or the cap perimeter flange contacts the surface, but the first sealing member does not. A second sealing member or secondary seal can be disposed adjacent a lower surface of the rigid cap. The secondary seal can be spaced a distance above or recessed upward relative to the cap rim, or the lowermost portion of the cap, so that when the cap is placed on the reference surface before installation, the cap rim, or the lowermost portion of the cap, contacts the surface, but the second sealing member does not.

In even a further embodiment, a method of use of the fastener cap system is provided. The method can include providing a plurality of rigid caps, each rigid cap including a cap uppermost surface and a cap lowermost surface, each rigid cap bounded by a cap rim, each cap rim joined with an adjacent cap rim of an adjacent rigid cap via a cap connector, each rigid cap joined with a sealing member, the sealing member being disposed above the cap lowermost surface and below the cap uppermost surface in a pre-installation mode; and moving the plurality of rigid caps along a cap feeder toward a driving station such that at least one of the cap lowermost surface and the cap uppermost surface slidably engages the cap feeder, but the sealing member does not engage the cap feeder in the pre-installation mode.

In even yet a further embodiment, the method can include installing each rigid cap relative to a substrate by penetrating each rigid cap and respective sealing member with a fastener. Each sealing member can include a secondary seal disposed on a lower surface of each rigid cap, but above the lowermost portion of the cap in the pre-installation mode. The rigid cap can be deformed during the installing of the cap so that the secondary seal can be moved to be flush with the lowermost portion of the cap when it is in an installed mode, thereby forming a seal around a fastener extending through the rigid cap and the sealing member adjacent the substrate.

In still a further embodiment, each sealing member can include a seal disc disposed on an upper surface of each rigid cap, but below the uppermost portion of the cap in the pre-installation mode. The rigid cap can be deformed during the installing, but the seal disc can remain below the uppermost portion of the cap in the installed mode, the seal disc forming another seal around the fastener extending through the rigid cap and the seal disc adjacent a head of the fastener.

The fastener cap system of the current embodiments provides benefits that were not previously achievable. Where the fastener cap system includes a sealing member, that member can impair infiltration of liquid under the cap. In cases where the cap includes a central seal disposed atop the cap, a head of a fastener can engage that central seal to impair liquid from infiltrating under the cap adjacent the hole around the fastener. Where the sealing member does not extend under the cap, by the central cap disc and/or to the fastener, or where the seal is discontinuous under the cap, moisture that enters under the cap can be impaired from wicking to the hole made in a substrate by the fastener. In many cases, water infiltration can be reduced over non-sealed caps by at least 50×, at least 100×, at least 200×, at least 300×, at least 400×, at least 500×, at least 600× or more. Where the cap includes a secondary seal ring, that ring can provide a separate barrier to impair moisture from reaching the fastener and its associated hole in a substrate. Where the sealing member is disposed below an uppermost portion of the cap, and/or above a lowermost portion of the cap, the cap can be fed in a cap feeder associated with an automatic fastener cap installation tool. The sealing member, which may be of a higher coefficient of friction than the material of the cap relative to a reference surface of the cap feeder, thus does not impair the movement of the cap or a strip of caps along the cap feeder. Indeed, the cap or a strip of caps can move easily and quickly toward a driving station of the fastener cap installation tool. In cases where the method includes co-molding or two shot molding, the caps can be manufactured in strip form in an efficient manner. Where the method includes co-extruding different materials to produce the rigid caps with the joined sealing members, the caps also can be manufactured in strip form in an efficient manner.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIG. 12 is a section view of the molded rigid caps being placed in the sealing member cavities of the second mold.

FIG. 13 is a section view of the first and second molds closed again, with elastomeric material being introduced in the second mold to form the sealing members on the molded rigid caps.

DETAILED DESCRIPTION OF THE CURRENT EMBODIMENTS

Figure 1:
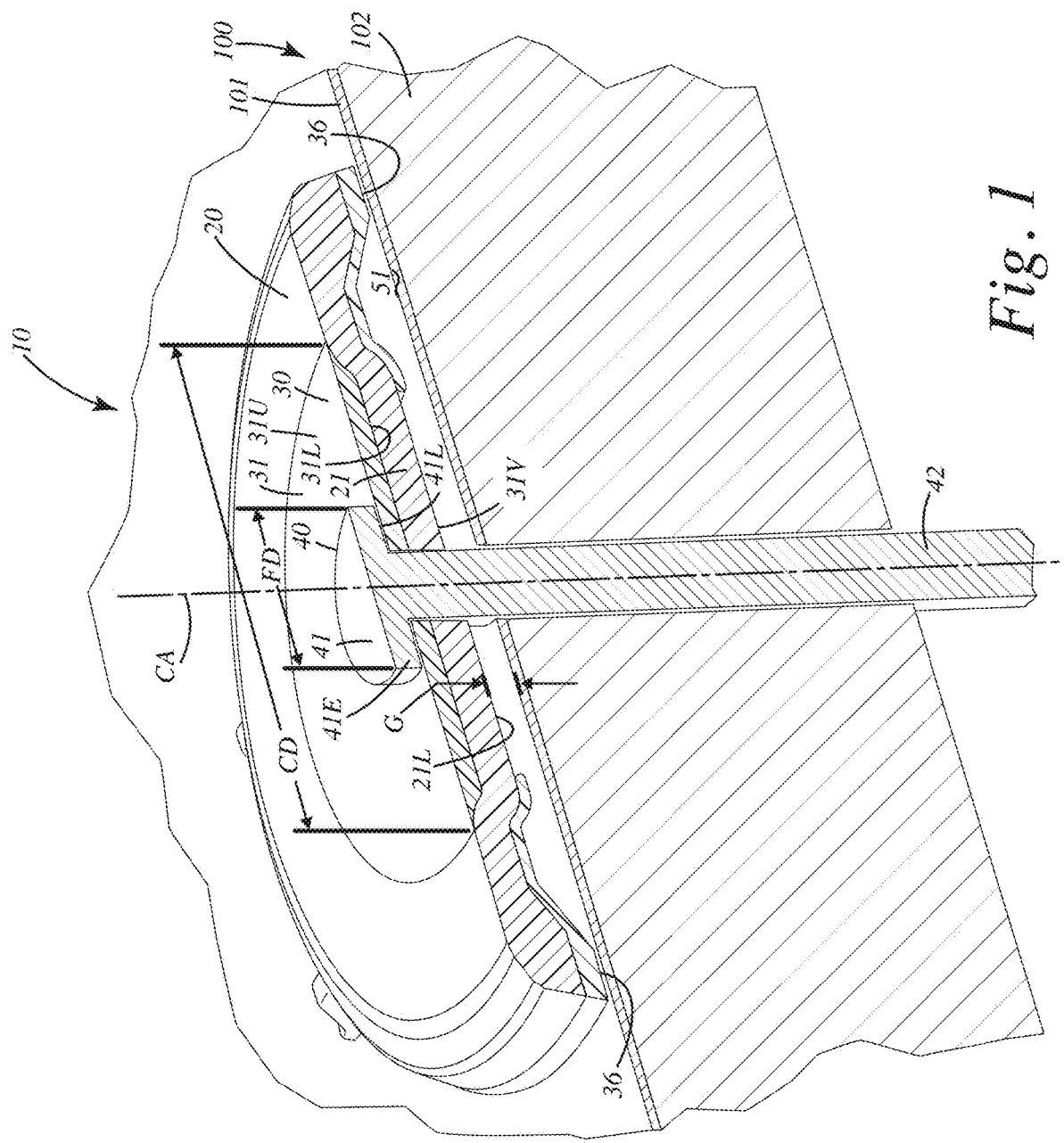
FIG. 1 is a perspective view of the fastener cap system of a current embodiment installed relative to a substrate which comprises a building wrap over a building panel.

A current embodiment of the fastener cap system is shown in FIGS. 1-7 and generally designated 10. The fastener cap system 10 is shown installed relative to a substrate, 100, which can include a layer 101 and an underlying structure 102. The layer 101 can be a sheet, a film, a panel or other components, such as roof felt, building wrap, and/or underlayment. The support structure can be a sheet, a panel, a beam, a truss, a rafter or other structure constructed from wood, metal, composites and/or combinations of the foregoing. The fastener cap system can include a rigid cap 20, a sealing member 30 and a fastener 40. The fastener 40 can project through both the rigid cap and part of the sealing member, into the substrate, thereby compressing or pushing the sealing member and cap against the substrate to secure a portion of the substrate, and/or components of the substrate to one another and/or an underlying structure.

With reference to FIGS. 1, 4 and 6-7, the fastener cap system 10 can include the rigid cap 20 and a sealing member 30. The rigid cap 20 can be fully or partially rigid, and in some cases can be somewhat flexible and/or resilient. The rigid cap can be constructed from a polymeric material, such as polypropylene, polyethylene, thermoplastic, or composites (paper, wood, or otherwise), or metals, such as steel, copper, aluminum, brass or other materials or combinations of the foregoing. The rigid cap 20 can include a central cap disc 21. The central cap disc optionally can be centered on the central axis CA of the fastener cap system 10. The central cap disc 21 can be in a true disc shape, being generally circular, or can be of a polygonal, elliptical, rounded, block or other shape. The central cap disc 21 can be sunken in a cap perimeter flange 22, with a recess wall 23 formed adjacent and forming a boundary around the central cap disc 21. The recess wall 23 and central cap disc 21 can cooperate to form a recess 24 within which a portion of a central seal disc 31 can be disposed as described below. In other applications, the central disc is not sunken, and can even be raised relative to the cap perimeter flange 22.

The rigid cap 20 can include an upper cap surface 20U and a lower cap surface 20L. The upper cap surface can generally face upward when the system 10 is installed, and the lower cap surface can generally face downward when the system 10 is installed. The upper cap surface 20U in the area of the central cap disc 21 can be joined with and/or partially or fully covered by the central seal disc 31. These components can be chemically and/or physically joined or bonded to one another. The central seal disc 21 optionally can be centered on the central axis CA of the fastener cap system 10. The central seal disc 31 also can be in a true disc shape, being generally circular, or can be of a polygonal, elliptical, rounded, block or other shape. As shown, the central seal disc can be of the same or a similar shape as the central cap disc.

Figure 5:
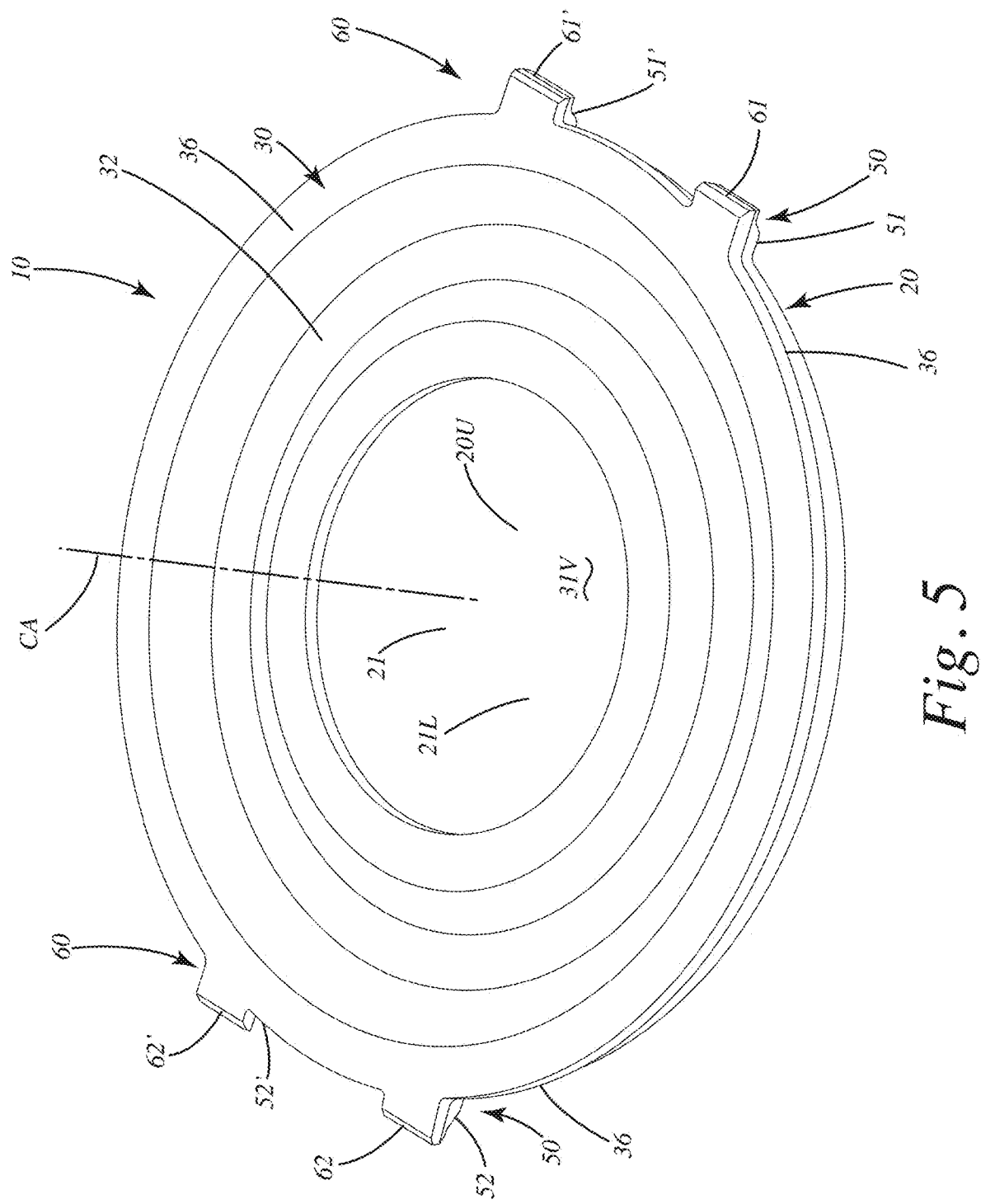
FIG. 5 is a perspective view of the bottom of the fastener cap system showing a seal perimeter ring and seal rim, with the sealing member being discontinuous in the center of the fastener cap system on the underside of the rigid cap.
Figure 6:
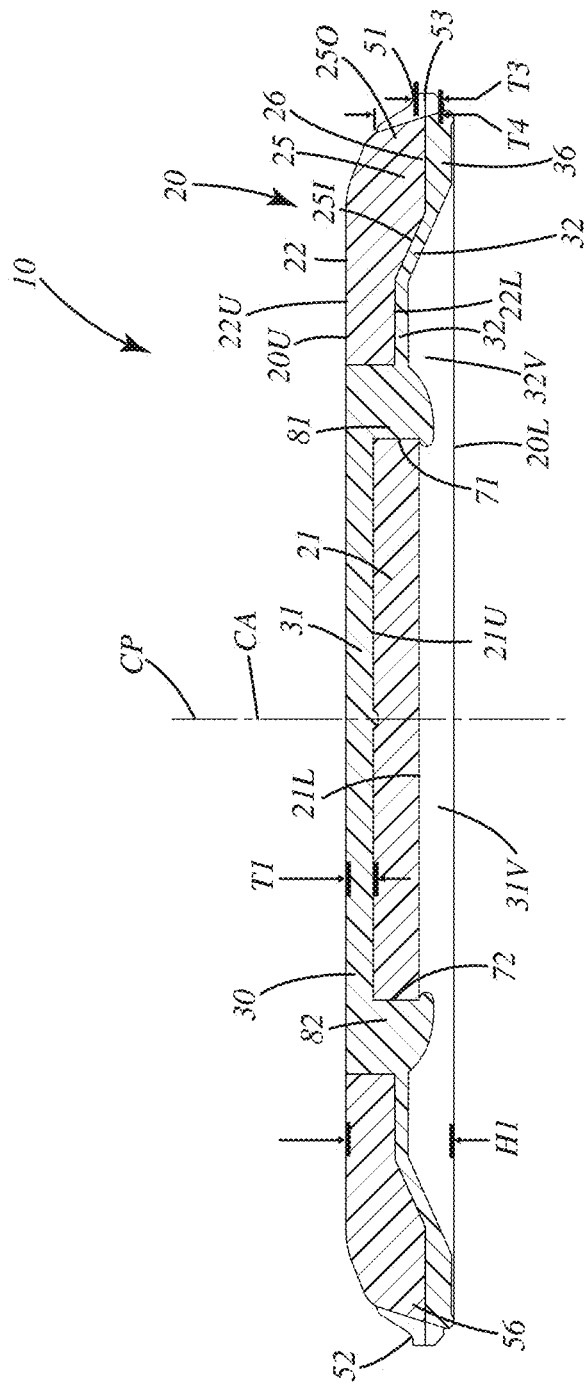
FIG. 6 is a section view of the fastener cap system taken along line 6-6 in FIG. 3.
Figure 7:
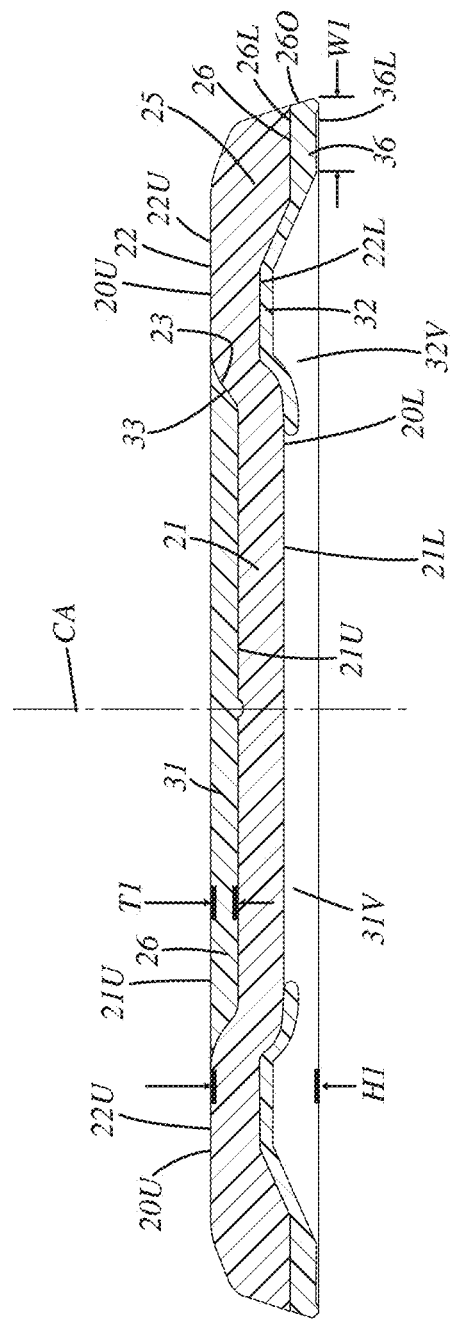
FIG. 7 is a section view of the fastener cap system taken along line 7-7 in FIG. 3.

The lower cap surface 20U, however, can be fully or partially uncovered by the sealing member in certain regions. As shown in FIGS. 5-7, the lower cap surface 20U under the central cap disc 21 can be uncovered by, free from or without any part of the sealing member optionally around the central axis CA, which can correspond to a location where the fastener 40 extends through the system 10. Where the lower cap surface under the central cap disc is uncovered, a sealing member void 31V, which includes no sealing member parts, is formed. This void can be of a disc or circular shape, or of other shapes depending on the application. Optionally, in some applications, the lower cap surface under the disc 21 can be covered by the sealing member but only of a very small thickness of the same. In some cases, the rigid cap 20 can be constructed in this configuration so that the sealing member in this area will not contact the underlying substrate when the system 10 is installed.

Surprisingly and unexpectedly, in certain embodiments such as those shown, it has been discovered that without the sealing member extending to the fastener or central axis CA, under the central cap disc 21, for example, in constructions where there is a central sealing member void 31CV, the system 10 can seal better and impair or prevent wicking of moisture or liquid toward the fastener and central axis, and thus into the substrate 100. In many cases, water infiltration can be reduced over non-sealed caps by at least 50×, at least 100×, at least 200×, at least 300×, at least 400×, at least 500×, at least 600× or more. It is further believed that with the gap under the central cap disc, there can be an air pocket formed there, and this can be less prone to wicking of moisture or liquid toward the fastener and central axis CA.

With reference to FIGS. 1, 2 and 6-7, the rigid cap 20 also can include a cap perimeter flange 22 that can extend radially outward from the central axis CA and/or the central cap disc 21 and its wall. The cap perimeter flange 22 can extend outward from those components to a cap perimeter ring 25. The perimeter flange 22 can include an upper surface 22U and a lower surface 22L which can be coextensive with the upper cap surface and lower cap surface of the rigid cap 20 in general. The cap perimeter flange 22 can circumferentiate or otherwise surround the central seal disc 31 as well as the central cap disc 21. The upper surface 22U of the cap perimeter flange can be uncovered by the sealing member 30 and portions thereof. In this construction, the central seal disc does not extend up and over the portion of the cap perimeter flange 22. The lower surface 22L however can be covered by a corresponding seal perimeter ring 32 as described below. As used herein, any reference to an element as a "perimeter" element is not intended to limit that element to only a location at an outermost location. Instead, that element, and the word perimeter in general can refer to a part or component that is disposed or located generally at an outer portion or location, as well as an intermediate or inner portion location of the fastener cap assembly.

With reference to FIGS. 5-7, the cap perimeter ring 25 can be an annular ring as shown, or can be a rounded, an elliptical and/or a polygonal ring in other applications. The cap perimeter ring 25 can extend primarily downward from the perimeter flange 22 until it terminates at a cap rim 26. The ring 25 can vary depending on the application, and in some cases can be constructed for resilience or rebounding so that the system can exert a downward pressure to and through the cap rim 26. The cap perimeter ring 25 can include an outer surface 25O that transitions to the upper surface 22U of the cap perimeter flange 22. The cap perimeter ring 25 can include an interior surface 25I which can be coextensive with the cap perimeter flange lower surface 22L and the lower surface 20L of the cap. This interior surface can be curved and/or angled outwardly toward the cap rim 26. The cap rim 26 can extend around the rigid cap 20 and in particular around the cap ring 25 and the cap perimeter flange 22. The cap rim 26 can be of a circular shape and can be configured to be the lowest portion of the rigid cap 20 within the system. The cap rim 26 can also be in the form of an annular structure that extends around the central axis CA as shown.

As shown in FIGS. 2-6, the fastener cap system 10 can be constructed so it can be reproduced and included in a strip 10S. In this strip form, individual ones of the system 10 can be applied one by one with associated fasteners 40 to a substrate 100. To form the strip 10S, the individual cap fastener systems can be connected to one another, optionally about the cap rim 26, of each system or cap, via a system of cap connector tabs 50. For example, the rigid cap 20 shown in FIGS. 4 and 6 can include a first cap connector tab 51 projecting outwardly from the cap rim 26 and a second cap connector tab 52 projecting outwardly from the cap rim 26 distal and opposite the first cap connector tab 51. As shown, the first 51 and second 52 tabs can be disposed generally opposite one another relative to a plane CP of the cap 20 through which the central axis CA passes.

Figure 2:
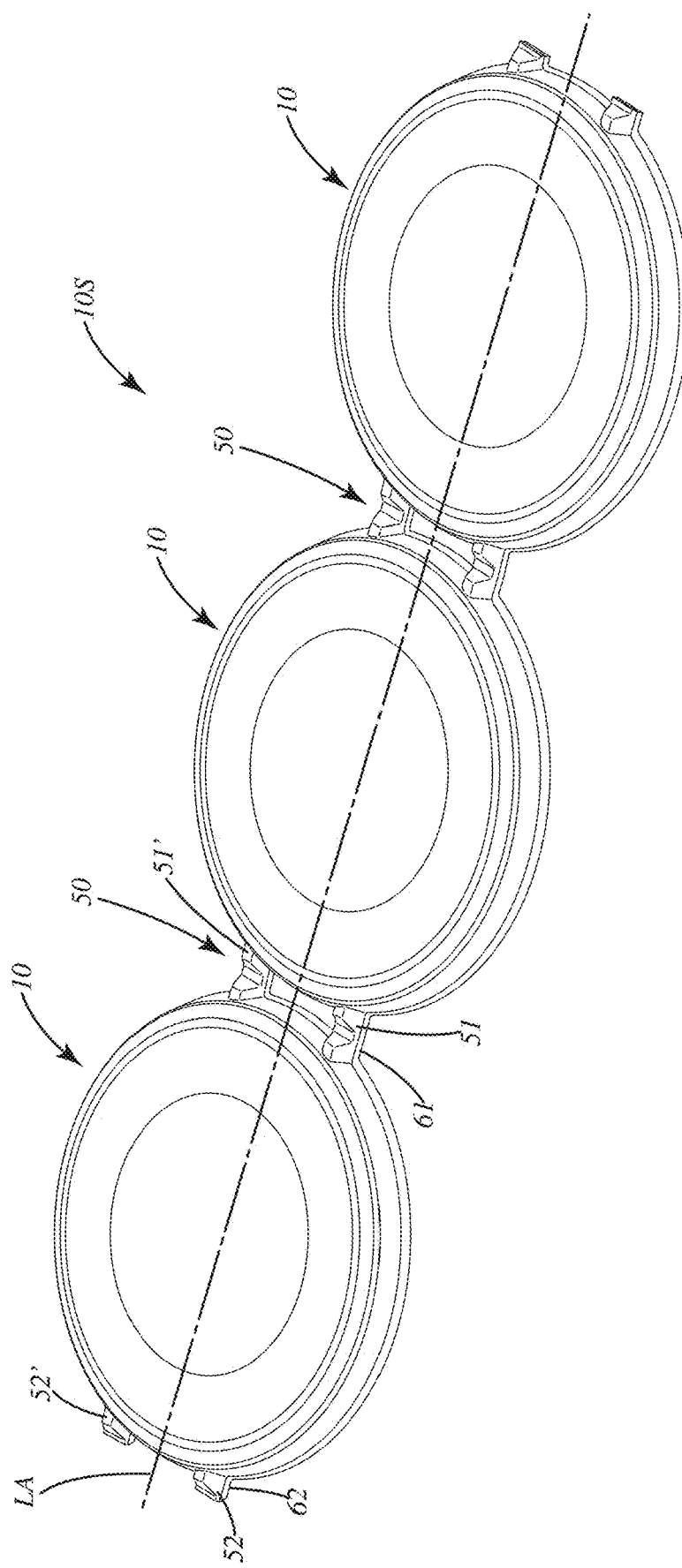
FIG. 2 is a perspective view of the fastener cap system in a carrier strip of multiple caps.
Figure 3:
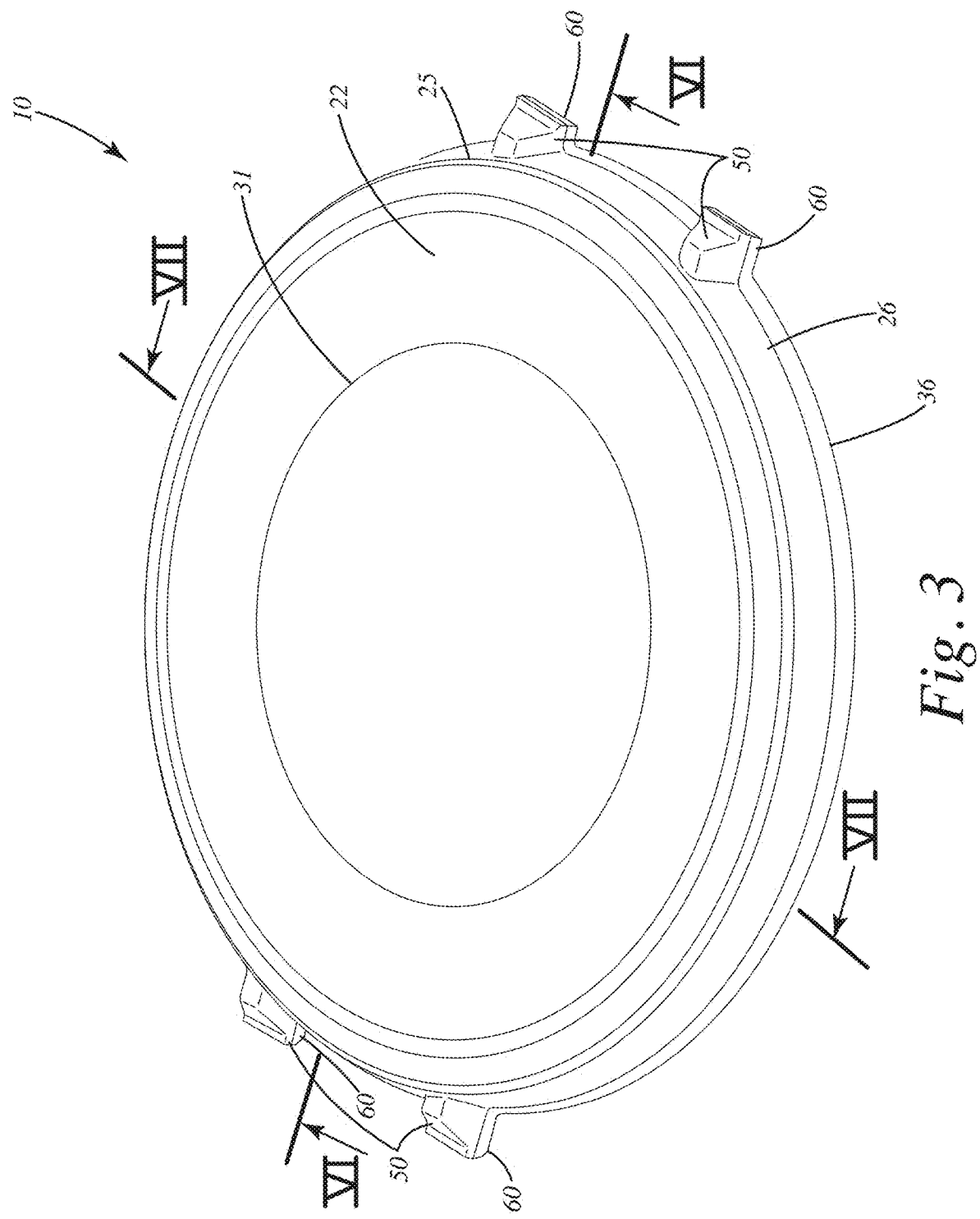
FIG. 3 is a perspective view of a top of the fastener cap system.
Figure 4:
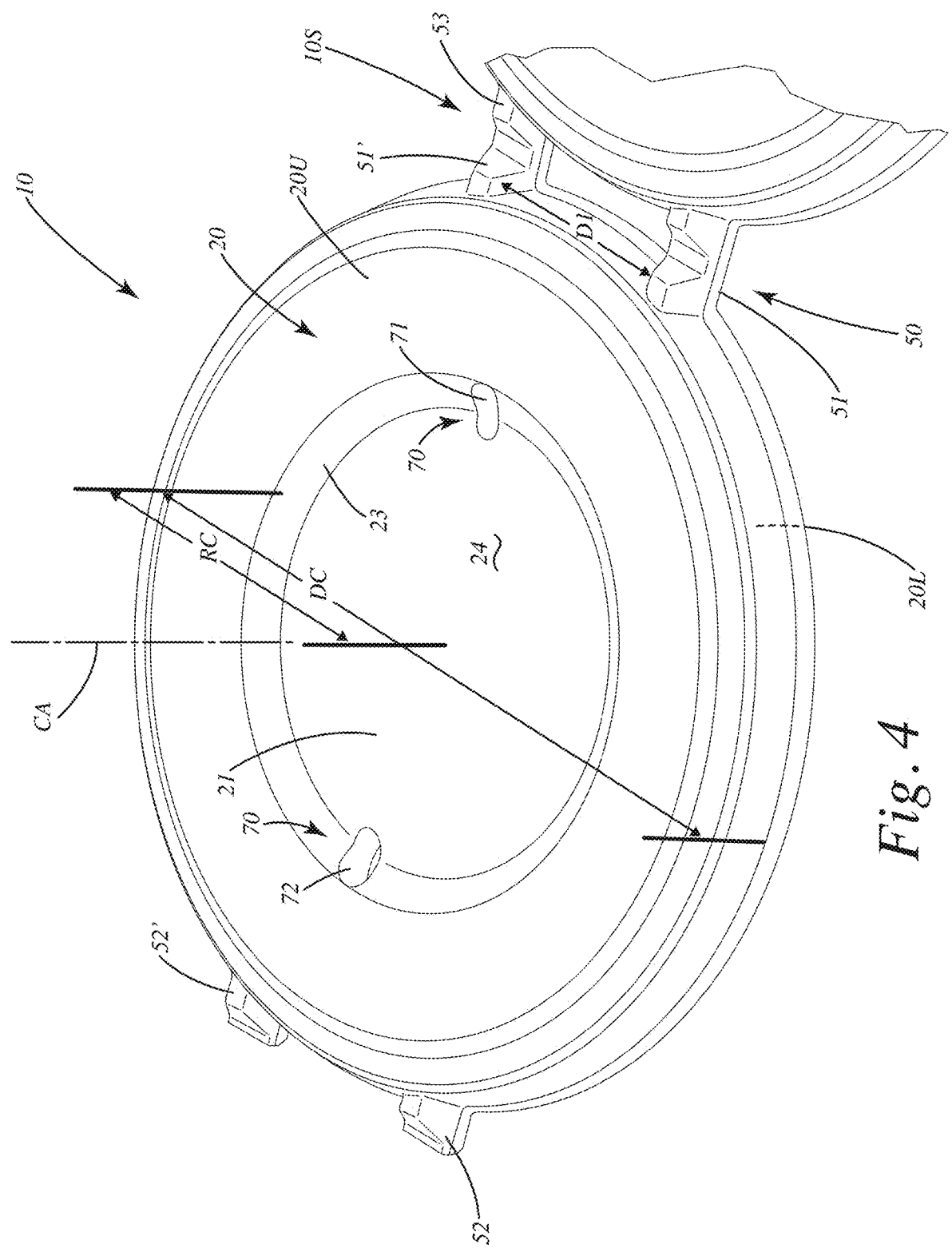
FIG. 4 is a perspective view of the top of the fastener cap system showing passageways for sprues of a sealing member of the fastener cap system.

In some applications, as shown in FIGS. 4 and 6, the first 51 and second 52 tabs can be duplicated on a common side of the fastener cap system 10 and rigid cap 20. For example, there can be another cap connector tab 51' adjacent the first cap connector tab 51. These tabs 51 and 51' can be spaced from one another by a distance D1. This distance D1 optionally can be less than a diameter DC of the cap, less than a radius RC of the cap and/or less than the height H1 of the system 10 or other distances and on the application. There also can be another cap connector tab 52' adjacent the second cap connector tab 52. These tabs can be spaced similarly to the tabs 51 and 51'. Optionally, the connector tabs on a side of the rigid cap 20 can prevent the individual caps in a strip 10S from rotating uncontrollably relative to one another about a longitudinal axis LA of the strip as shown in FIG. 2.

With reference to FIG. 6, each of the connector tabs 50 also can include a thinned region 53, which can have a thickness T3 that is less than an overall thickness T4 of each of the individual connector tabs, which thickness T4 can be less than the overall height H1 of each individual fastener cap system 10. This thickness can be selected so that the connector tabs 50 can be easily broken, torn or modified, so that one fastener cap system can be disassociated from an adjacent one in a strip, when a fastener 40 penetrates an individual cap or system 10 to secure a fastener cap system 10 to a substrate 100. Although not shown, the connector tabs can alternatively include perforations, zones of weakness, holes, recesses or other structures that allow separation of individual ones of the fastener cap system 10 from the strip 10S. Although not shown, in some cases, the connector tabs 50 can be absent, with the individual caps or fastener cap systems attached individually and independently, to a strip of tape. Multiple individual and independently formed caps can be adhered to the tape to effectively hold them in a strip. It will be appreciated that with the fastener cap systems collected and included in a strip form, the strip can be rolled upon itself into a circular roll for compact storage of the strip. When in this roll configuration, the fastener cap systems can be loaded into a magazine of a driving tool and advanced sequentially to a driving station of the tool so that individual fasteners 40 can be driven one by one through each respective fastener cap system 10 to secure or engage an underlying substrate. Suitable driving or installation tools can include those disclosed in U.S. Pat. No. 7,344,057 to Bruins entitled Automatic Washer Feeder for Automatic Nailer, or U.S. Pat. No. 6,968,945 to Bruins entitled Cap Assembly and Cap for Automatic Fastener Driver, or U.S. Pat. No. 10,960,525 to Vandenberg, entitled Hybrid Cordless Cap Tool, or U.S. Pat. No. 7,628,305 to Vandenberg, entitled Impact Fastener Tool with Cap Feed Arrangement, or U.S. Pat. No. 7,481,346 to Vandenberg, entitled Hammer-type Stapler Tool, all of which are hereby incorporated by reference in their entirety.

Optionally, although not shown, the connector 50 can be absent from the cap fastener system 10, but the multiple individual cap fastener systems 10 can be joined to another in a strip. In such a construction, the edges of the cap rims of adjacent caps can be directly joined with one another (not shown). In other constructions, portions of the sealing member 30 can be joined from one fastener cap system to the next such that the material of the sealing member is the material holding adjacent fastener cap systems to one another.

The sealing member 30 will now be described in more detail. The sealing member 30 can be constructed from an elastomeric material and joined with the rigid cap 20, optionally being chemically and/or physically bonded to the surfaces of the cap where the sealing member directly engages it. The elastomeric material optionally can be compliant and/or resilient, and can provide liquid tight and/or fluid tight sealing properties when disposed between the rigid cap and a substrate. The elastomeric material can be any one of a variety of materials, such as rubber, silicone, thermoplastic elastomers, thermoplastic urethanes, thermoplastic rubbers, thermoplastic vulcanizates, foams, such as closed or open cell foams, or other materials including chemical blowing agents, or other materials. The elastomeric material and the sealing member in general can have a durometer optionally between 30 Shore A and 80 Shore A hardness, between 50 Shore A and 75 Shore A hardness, less than 60 Shore A hardness, or other hardnesses depending on the particular application.

The sealing member 30 can include the central seal disc 31 as mentioned above. The central seal disc 31 shown in FIGS. 1, 3 and 7 can extend outward from the central axis CA of the system 10, optionally terminating at an outer seal disc wall 33. This outer seal disc wall 33 can be configured to be positioned adjacent the recess wall 23 of the cap 20. The outer seal disc wall can be angled or slanted outwardly to match the outward angled recess wall. The central seal disc 31 can include a thickness T1 that is less than or equal to the height H1 of the recess 26. As shown, the upper surface 21U of the central seal disc can be flush and/or parallel to the upper surface 20U of the cap and the upper surface 22U of the cap perimeter flange. Optionally, in other applications, that upper seal disc surface can project above the cap upper surface. The central seal disc, however, can terminate generally at the recess wall 23, such that the sealing member does not extend over the upper surface 22U of the cap perimeter flange 22, or to the cap perimeter ring 25 or to the cap rim 26, or the outer surface 260 thereof. In turn, this sealing member might not add rigidity to the cap perimeter flange so that it can bend more easily, without being impaired by added structure of the sealing member there, when bending or moving downward toward the substrate when a fastener is installed through the cap.

Optionally, the central seal disc 31 can have an upper seal dimension, as shown in the form of a diameter CD in FIGS. 1 and 4. This upper seal dimension CD can be greater than a dimension of the fastener 40, in particular greater than a diameter FD of the head 41 of the fastener 40. With this larger dimension of the central seal disc, that disc can extend far beyond the outer edge 41E of the head 41 of the fastener 40. The upper surface 31U of the central seal disc 31 also can engage the lower surface 41L of the head 41 of the fastener when the fastener shaft 42 is installed fully in the substrate 100, projecting through the layer 101 and into the panel 102. When the fastener cap system 10 is installed, the central seal disc 31 can be sandwiched between the head 41 of the fastener 40 and the central cap disc 21 of the rigid cap 20. The central seal disc 31 itself also can be directly joined with the central cap disc 21 and in particular the upper surface 21U of the central cap disc 21.

The sealing member 30 optionally can include one or more sprues that connect part of the sealing member 30 on the upper cap surface 20U to another part of the sealing member 30 on the lower cap surface 20L. This connection can be accomplished in several ways. As shown in FIGS. 4 and 6, the rigid cap can define one or more passageways 70 that extend through the cap 20. As shown, there are first 71 and second 72 passageways disposed through the rigid cap 20. Of course, there may be more or fewer passageways depending on the application and the material of the sealing member. The passageways as shown can extend through at least a portion of the recess wall 23 and a portion of the central cap disc 21. In other applications, the passageways can extend through the cap flange 22 or other portions of the rigid cap 20. The passageways can be fully surrounded by the material of the rigid cap, rather than being a simple edge or recess in an edge or rim of the rigid cap. The cap passageways 70 can be disposed on opposite sides of the central axis CA or central plane CP so that when being formed, the flowable material that forms the sealing member can flow through the passageways, engaging and contacting portions of the upper surface as well as the lower surface of the rigid cap 20, forming various sealing member structures above and below the rigid cap as described below. Optionally, the passageways 71 and 72 can be centered between respective tab connectors, connector tabs 51 and 52 on opposite sides of the central plane CP of the system 10.

As mentioned above, the fastener cap system 10 can include a central seal disc 31. This central seal disc 31 can extend to the central seal disc outer wall 33. The outer wall 33 of the sealing member can include a first sprue 81 extending through the first passageway 71 generally from the upper surface 20U to the lower surface 20L. Opposite that sprue, on the other side of the central plane CP, as shown in FIG. 6, the central seal disc 31 can be joined with a second sprue 82 that extends through the second passageway 72 defined by the rigid cap, extending generally from the upper surface 20U to the lower surface 20L of the rigid cap 20. The first and second sprues can be substantially identical in shape and size to the respective passageways through which they extend. The sprues themselves can completely fill the passageways such that there are no air gaps or pockets within the passageways. This can be particularly true where the sealing member is in a flowable form when it is applied to the surfaces of the rigid cap 20, flowing through the passageways, as described below.

With reference to FIGS. 5-7, the sealing member 30 can further include a seal perimeter ring 32. The seal perimeter ring 32 can extend under the cap perimeter flange 22 and can be joined directly with the lower surface 22L thereof. The seal perimeter ring 32 can extend under and can be joined directly to the lower surface 20L of the cap 20 and the lower surfaces of the respective ring 25 and seal rim 26. At these locations, the seal member can be chemically and physically bonded to the lower surfaces of these respective components. The seal perimeter ring 32 further can be joined via the sprues 81 and 82 to the central seal disc located above the central cap disc, via the respective passageways 70 extending through the rigid cap 20. The central seal disc 31, the seal perimeter ring 32, and seal rim 36 can be joined integrally with one another to form a one piece monolithic unit. Even though these different components can be on and/or engage or directly contact respective upper 20U and lower 20L surfaces or portions of the rigid cap, these components can still be integral with one another and form the sealing member 30. Optionally, in some applications, the sprues and passageways can be eliminated from the rigid cap. The central seal disc 31 can be a separate independent component from the seal perimeter ring 32 and seal rim 36 of the respective upper and lower surfaces 20U and 20L of the rigid cap 20.

As mentioned above, the seal perimeter ring 32 can extend radially outwardly from the central axis CA. That ring and the respective sprues 81 and 82 optionally, however, do not extend all the way to the central axis CA under the central cap disc 21. For example, as shown in FIGS. 5-7, the lower surface 21L of the central cap disc 21 is not covered substantially by the sealing member 30. This of course is different from the upper surface 21U of the central cap disc, which can be directly engaged by and covered by the central seal disc 31. Optionally, the central cap disc 21 can be uncovered by the sealing member 30 on the lower cap surface 20L particularly around the region of the central axis CA and its lower surface 21L. As shown in FIG. 1, when the fastener cap system 10 is installed, there can be a gap G between the central disc cap disc lower surface 21L and the upper surface of the sheet 101. This can allow airflow around the fastener shaft, and can impair wicking of moisture toward that shaft in the gap G with a structure, such as part of the sealing member. When installed, this also results in the sealing member not being disposed between the central cap disc 21 and the sheet 101, and the region around the shaft 42 of the fastener 40. Surprisingly, in constructions where the sealing member does not extend to the shaft, this can impair and/or prevent wicking of moisture along the surfaces of the sealing member and/or within the sealing member toward the shaft and subsequently into the substrate 100. Optionally, the sealing member 30 in such constructions can define a central seal void 31V that is generally aligned with the central cap disc 21 and in particular the lower surface 21L of the central cap disc 21. As shown in FIGS. 5-7, the seal perimeter ring 32 can extend radially outward from the central seal void 31V toward the seal rim 36.

As mentioned above, the sealing member 30 can extend along the upper cap surface 20U and lower cap surface 20L of the rigid cap 20. With reference to FIGS. 1, 5 and 7, the seal perimeter ring 32 can extend along the cap perimeter flange 22 and the cap perimeter ring 25 ultimately to the cap rim 26. There, the sealing member can include a seal rim 36. The seal rim 36 can be disposed adjacent and in direct contact with the cap rim 26. When installed with the fastener cap system 10, the seal rim 36 can be configured to engage substrate 100 and form a first liquid barrier around the rigid cap 20 so that moisture is impaired from entering under the system 10, in the space S1 between the lower cap surface 20L and the substrate 100. The seal rim 36 can be of a width W1 and can generally surround and/or circumferentiate the central axis CA. The seal rim width W1 optionally can be less than the diameter FD of the fastener 40 as shown, less than the radius of the cap RC, less than the diameter of the DC, less than the height H1 of the fastener system 10 or greater than the thickness T1 of the seal central seal disc 31, depending on the application. Of course in other applications, the width W1 can be greater than these values. When the fastener cap system 10 is installed on a substrate 100, the seal rim 36 can contact the substrate 100 across substantially all of the width W1. Although not shown, in some cases, the seal rim 36 can include multiple ridges and/or depressions, which optionally can be concentric rings within the width W1, to provide multiple sealing surfaces along the seal rim 36. As shown, the seal rim 36 can include a lower surface 36L that is generally flat and/or planar, but that can be of an annular or ring shape. The seal rim 36 optionally does not extend inward toward the central axis and/or cover the lower surface 21L of the central cap disc 21.

The seal rim 36 of the sealing member 30 can perform a sealing function in the fastener cap system when it is installed. In particular, the seal rim 36 can form first liquid barrier around the rigid cap and system 10 to impair moisture from entering under the rigid cap and system. As used herein, "moisture" can include liquid, droplets, vapor, condensation and the like. Moisture can be produced by various environmental conditions such as precipitation, which can come in a variety of form of rain, snow, sleet, fog, hail and the like. As used herein "impair" in its various forms can include ceasing, stopping, preventing, reducing, decreasing and/or ameliorating something.

As shown in FIG. 1, the seal rim 36 can form a liquid tight seal between system 10 and/or cap 20, and the substrate 100, thereby impairing moisture from entering in the space S1 under the cap, between the substrate and that cap. In addition, the central seal disc 31 disposed on the upper surface 20L of the cap 20 forms another seal around the fastener, and in particular around the fastener shaft 42 under the fastener head 41. This second seal can prevent moisture from entering under the fastener head 41 and generally along the fastener shaft, through the upper surface of the fastener cap system 10. Where the lower surface 21L of the central cap disc 21 is uncovered by any portion of the sealing member 30, this also can be helpful in some applications to impair wicking of moisture in case it somehow does wick or seep past the sealing rim 36, generally between the cap and the substrate.

Optionally, the fastener cap system 10 includes a first moisture infiltration impairing seal between the fastener head 41 and the central cap disc 21 and/or upper surface 20U of the rigid cap. This seal can be in the form of the central seal disc 31. This seal, however, as shown does not seal in the region around the fastener and its shaft under the lower surface 20L of the cap 20. Instead, it only seals above the central cap disc, not below it. The second moisture infiltration impairing seal of the fastener cap system 10 can interact with the cap and operate in a different way. Specifically, that second seal can be in the form of the seal rim 36 of the sealing member. This seal rim is located on the lower surface 20L of the cap, distal from and disposed radially outward from the first moisture infiltration impairing seal that can directly engage the fastener, and in particular the fastener head. The second seal at the seal rim does not engage the fastener at all, and instead is interposed between the cap rim 26 and the substrate, rather than the cap and the fastener as the first seal. The sealing member thus can sealingly engage the fastener above the rigid cap around the central axis, but not below the cap in that area. The sealing member also can simultaneously sealingly engage the substrate below the cap around the perimeter of the cap via the seal rim. The seal rim, however, does not extend to the fastener, nor directly seal around it. The seal rim can seal around the rigid cap in a location radially outward from the cap disc, under the cap, whereas the seal disc can seal around the fastener in a location adjacent and over the cap disc, over the cap.

With reference to FIGS. 4-6, the sealing member 30 optionally can include seal connector tabs 60. The seal connector tabs can be associated with each of the respective cap connector tabs 50. In particular, the sealing member 30 can include a first seal connector tab 61 projecting outwardly from the seal rim 36. The first seal connector tab 61 can be joined with the bottom of the first cap connector tab 51 as described above. The sealing member 30 also can include a second seal connector tab 62 projecting outwardly from the seal rim 31, opposite the first seal connector tab, across a central plane CP to which the central axis CA extends. The second seal connector tab 62 can be joined with the second cap connector tab 52 and again opposite the first seal connector tab 61. As with the cap connector tabs, each of the respective seal connector tabs can be duplicated on a side of the central plane CP of the cap 20. For example, there can be two tabs 61 and 61' on one side of the system 10 and two seal tab connector tabs 62 and 62' on the opposite side. These respective sets of seal connector tabs can connect sealing members of the adjacent fastener cap systems 10 when disposed in a strip 10S. As mentioned above, in some cases, these seal connector tabs 60 optionally can connect adjacent rigid caps, whether or not the cap connector tabs are included.

Figure 8:
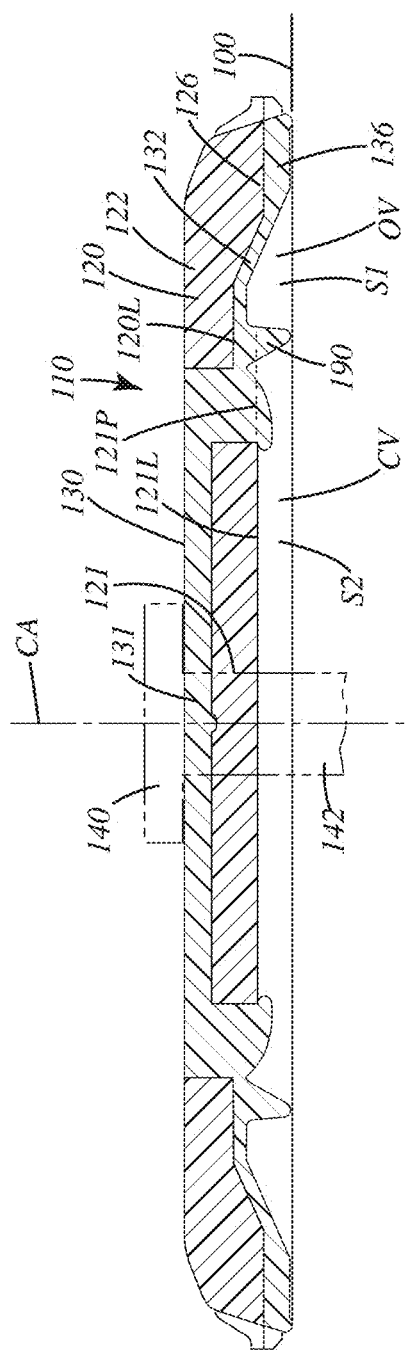
FIG. 8 is a section view of a first alternative embodiment of the fastener cap system.

In some applications, one or more additional liquid barriers can be formed by the sealing member 30 in the fastener cap system 10. For example, a first alternative embodiment of the fastener cap system is shown in FIG. 8 and generally designated 110. This fastener cap system can be virtually identical to the fastener cap system 10 of the embodiment above in structure, function and operation with several exceptions. For example, fastener cap system 10 can include a sealing member 130 including a central seal disc 131 disposed over a central cap disc 121 of a rigid cap 120. The sealing member 130 also can include a seal perimeter ring 132 that extends outward to a seal rim 136 which forms the first barrier to impair moisture from entering the first space S1 under the rigid cap between the lower cap surface in the substrate. This embodiment of the fastener cap system, however can include a secondary seal ring 190 disposed between the seal rim 136 and the central axis CA. This secondary seal ring can extend downward, generally from the lower cap surface 120L. This secondary seal ring 190 can be positioned between the central cap disc 121 and the cap perimeter flange 122 or generally between the central cap disc 121 and the cap rim 126. This secondary seal ring 190 can impair moisture from entering a second space S2 under the rigid cap 20. That second space S2 can be located between the secondary seal ring 190 and the second central axis CA. The secondary seal ring 190 can form an annular or circular ring as shown. Of course, in other applications, the secondary seal ring 190 can be polygonal, elliptical, rounded or other shapes.

The secondary seal ring 190 can form an integral part of the sealing member 130 on the lower surface of the cap. The secondary seal ring 190 can be part of the one-piece, monolithic sealing member. The secondary seal ring can be disposed and extend above and below a plane 121P that extends from the lower surface 121L of the central cap disc 121. In some applications, the secondary seal ring can be positioned to extend only below that plane 121P, without extending above it. This secondary seal ring 190 also can be replicated so that there are multiple secondary seal rings (not shown) to form multiple seals around the central axis CA and thus around the fastener 140 when the fastener is installed. This can further impair moisture from entering under the cap and eventually infiltrating to the fastener and the hole in the substrate 100 created by the fastener 140 when the fastener cap system 10 is installed relative to the substrate 10.

The secondary seal ring 190 of the first alternative embodiment shown in FIG. 8 can extend downward from the lower cap surface 120L toward the substrate and can engage the substrate 100. The ring 190 can circumferentiate the fastener 140 and in particular the fastener shaft 142. The secondary seal ring 190 can be distal from the central axis CA and from the fastener along the lower cap surface 120L. The precise distance can be selected depending on the application. The seal perimeter ring 190 can create an outer void OV which is coextensive with the first space S1 under the cap perimeter flange 122 and generally between that perimeter flange 122 and the substrate 100. The secondary seal ring 190 can form a central void CV that is coextensive with the second space S2 under the central cap disc 121 when the fastener 140 and rigid cap 120 are installed relative to the substrate 100. These two voids, that is the outer void OV and the central void CV can be isolated and separated from one another by the secondary seal ring 190. The outer void OV and space S1 can be bounded by the seal rim 136 and the secondary seal ring 190, as well as the substrate 100. The central void CV and space S2 can be bounded by the secondary seal ring 190 and the shaft 142, as well as the substrate 100, when the fastener cap system is fully installed relative to the substrate.

Figure 9:
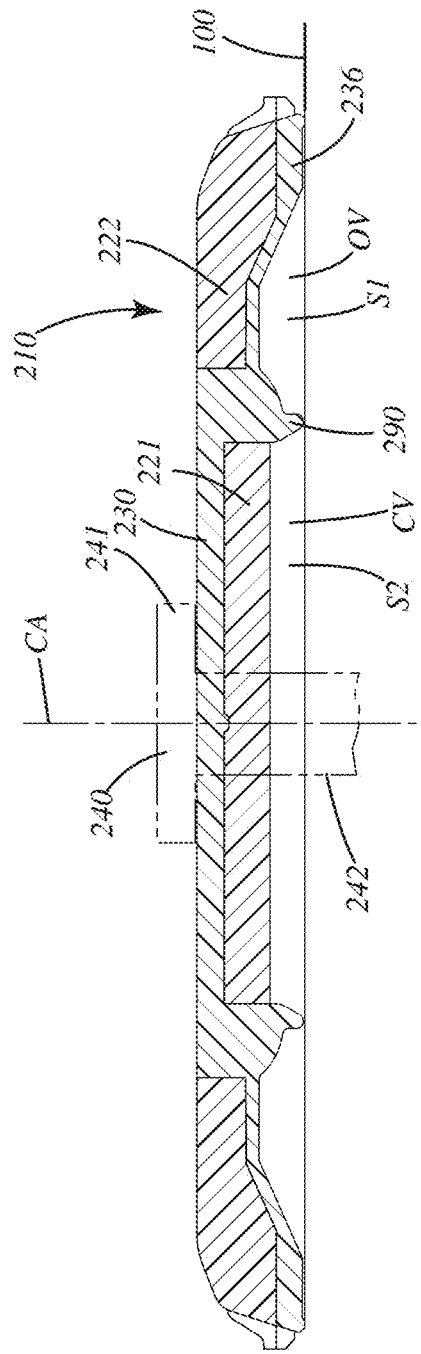
FIG. 9 is a section view of a second alternative embodiment of the fastener cap system.

A second alternative embodiment of the fastener cap system with another secondary seal ring is shown in FIG. 9 and generally designated 210. This fastener cap system 210 can be similar to the fastener cap systems 10 and 110 described above in structure, function and operation with several exceptions. For example, this fastener cap system 210 can include a secondary seal ring 290 which can also form a portion of the sealing member 230. This secondary seal ring 290 however can be disposed closer to the central axis CA and the fastener shaft 242. This secondary seal ring also can be disposed more under the central cap disc 221, rather than under the cap perimeter flange 222. With this placement, when the fastener head 241 pushes downward on the central cap disc 221, that cap disc also can push the secondary seal ring 290 into more sealing engagement with the substrate 100. The secondary seal ring 290 can similarly form an outer void OV or first space S1 and a central void CV or second space S2 that are separated from one another by the secondary seal ring 290. Again, the secondary seal ring 290 can form a second barrier in addition to the first barrier formed by the seal rim 236 of the sealing member 230.

A method of manufacturing a fastener cap system of the current embodiments will now be described. In general, the method can include forming a plurality of rigid caps, each rigid cap comprising a central cap disc extending to a downwardly extending cap perimeter flange, and a cap perimeter ring joined with the cap perimeter flange, the cap perimeter ring including a cap rim, each cap rim joined with an adjacent cap rim of an adjacent rigid cap via a cap connector; and joining a plurality of sealing members constructed from an elastomeric material with each of the respective plurality of rigid caps, each sealing member comprising a central seal disc disposed over the central cap disc, the central seal disc having an upper seal dimension greater than a head dimension of a head of a fastener configured to extend through the rigid cap and the sealing member, a seal perimeter ring extending along the cap perimeter ring to a seal rim, the seal rim being disposed adjacent the cap rim and configured to engage a substrate and form a first liquid barrier around the rigid cap so that moisture is impaired from entering a first space under the rigid cap between a lower cap surface and the substrate.

In one implementation of the above method of manufacturing the fastener cap system 10, 110 and/or 210, the fastener cap system can be formed in a strip or continuous string of multiple fastener cap systems connected to one another in an injection molding process, optionally a two shot injection molding process. FIGS. 10-13 illustrate this process in general. Starting with FIG. 10, the injection molding can utilize a first mold 91 and a second mold 92. The first mold 91 can be configured to mold a strip of rigid caps 20 in multiple individual cap mold cavities 91C. These cap mold cavities can be coextensive with one another and joined with respective cap connector tab cavities 91T. Each of the individual cap mold cavities 91C can be joined with a runner 91R that is in fluid communication with a source M1 of a first material. The first material can be a flowable polymeric material that can be used to construct the rigid caps 20 of the cap fastener system 10 in a strip form. Each one of the mold cavities 91C can be configured to include the various surfaces that form the respective components of each individual rigid cap 20, for example the central cap disc 21, the perimeter flange 22, the cap perimeter ring 25 and the cap rim 26, for example, as shown in FIGS. 4 and 6-7. Again, the cap connector tab cavities 91T can be structured to allow material to flow from one cap mold cavity to the next and form respective cap connector tabs 51 and 52.

During the method, a flowable polymeric material is introduced from the material source M1 through the runners 91R, into the cap mold cavities 91C and the respective cap connector cavities 91T. The material can cure to form multiple individual rigid caps 20, with each of the rigid caps joined with an adjacent rigid cap via a respective cap connector tab. This is shown in FIG. 11, which shows a strip 10S with the rigid caps 20 connected by the cap connector tabs 50 being moved in direction A out from the mold 91 and cap mold cavities 91C after the mold 91 is opened by moving parts 91A and 91B away from one another.

Figure 10:
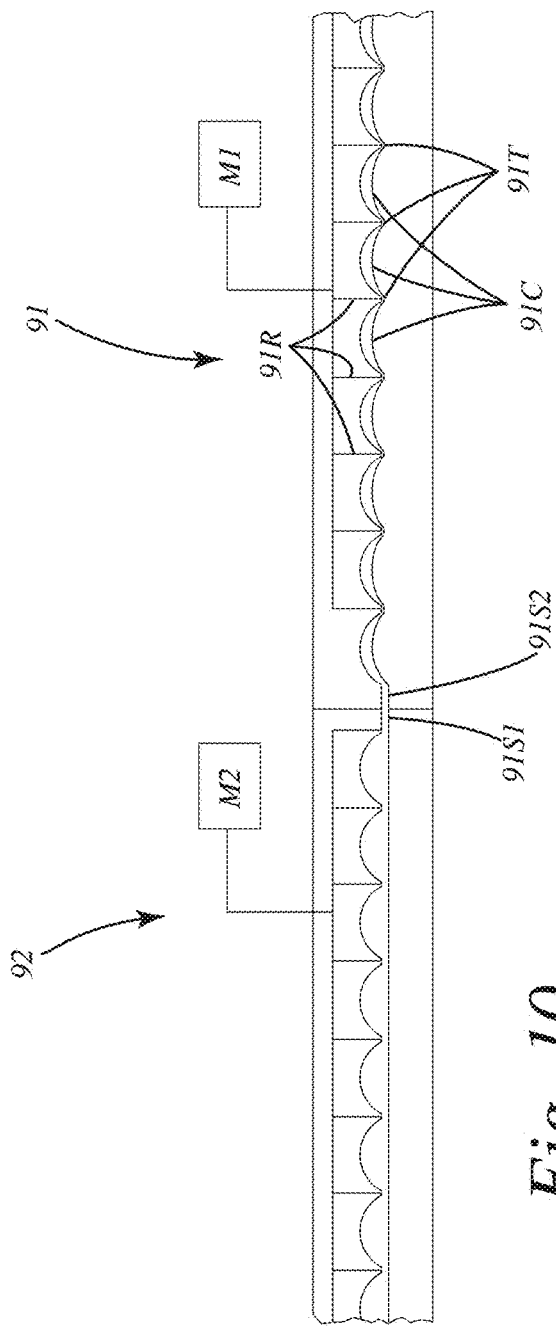
FIG. 10 is a section view of a first mold adapted to mold multiple rigid caps of the fastener cap system in a strip, as well as a second mold configured to mold sealing members to multiple rigid caps.

Optionally, as shown in FIG. 10, the first mold 91 can be configured such that includes a tag cavity 91S2. Although shown only at the left side of the mold 91, another similar tag cavity can be formed to the right of the first mold 91. This tag cavity can allow the formation of one or more tags 50T that extend from opposing ends of the strip 10S after the rigid caps are molded.

Figure 11:
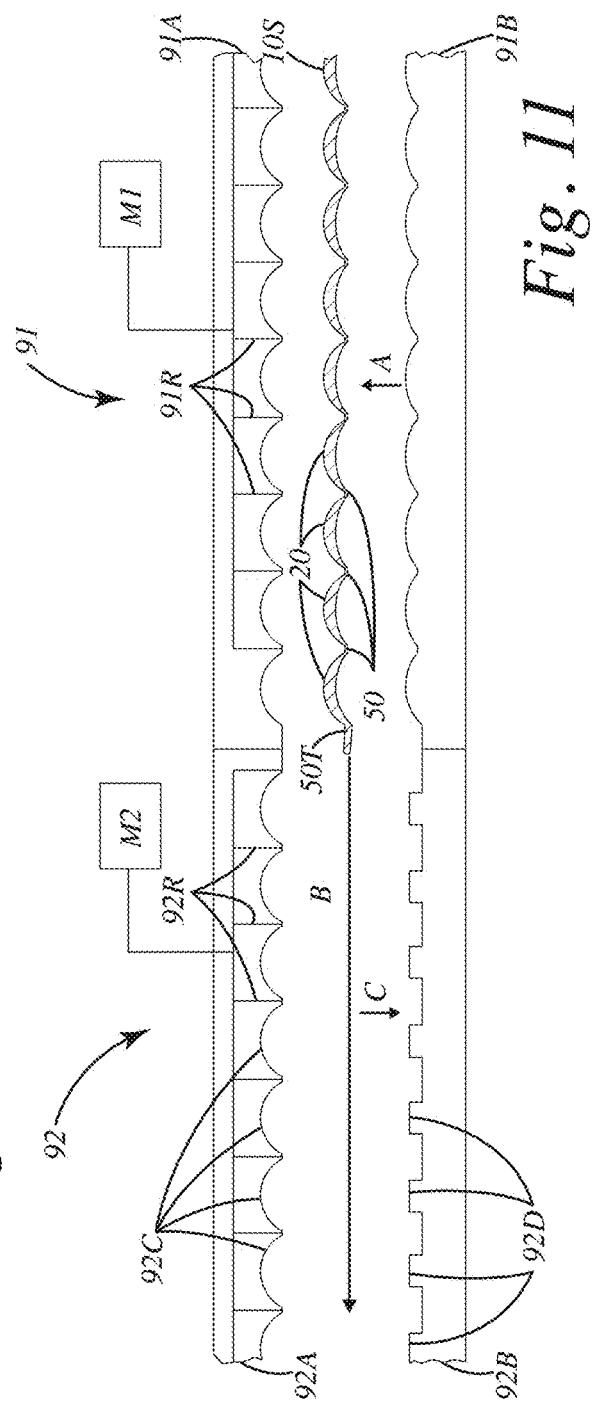
FIG. 11 is a section view of the first and second molds opened, with molded rigid caps being moved from the first mold to the second mold.

With reference to FIG. 11, the strip 10S can be moved in direction B such that the rigid caps are aligned with corresponding sealing member cavities 92C. After this alignment occurs, the strip 10S of caps can be moved toward the lower parts 92B of the second mold 92. In this movement in direction C, the caps can be aligned with the projections 92D that are configured to form the central void 31V and parts of the outer void 32V under the rigid caps, as described above, after the sealing members 30 are formed.

FIG. 12 illustrates the strip 10S placed over the projections and aligned with the respective sealing member mold cavities 92C. There, each of the respective rigid caps are aligned with the respective projections 92D. Optionally, the strip tag 50T at the end of the strip 10S can be placed so that it projects at least partially into one of the cap mold cavities 91C, and optionally the end cap cavity 91C1.

With the strip 10S placed in the second mold 92, the first 91 and second 92 mold can be closed as shown in FIG. 13. An elastomeric material can be introduced from the source M2 through the runners 92R into the second mold 92 and subsequently into the sealing member cavities 92C around the portions of the already formed rigid caps in strip form inside those cavities. The elastomeric material can flow over and can bond to the surfaces of the individual caps 20 and cap connector tabs 50 on the strip 10S. This in turn can start to form the multiple sealing members 30 on respective ones of the rigid caps 20 as described in connection with the embodiments above. These sealing members so formed can include the respective central seal disc 31, the sprues 81 and 82 that extend through the passageways 71 and 72, respectively, as well as the seal perimeter ring 32 and seal rim 36. The elastomeric material also can form respective seal connectors 60 joining each of the respective seal rims as described above. This elastomeric material can be allowed to cure, and subsequently, the mold 92 can be opened to remove the finished fastener cap system 10 in the form of a strip 10S.

Optionally, before, during, or after the elastomeric material from the source M2 is introduced into this second mold 92 to form the sealing members 30 of the strip 10S, additional polymeric material can be introduced from the first source M1 through the runners 91R and into the respective cap mold cavities 91C to form yet another portion of the strip 10S. Where the tag 50T projects into the mold cavities, for example, the end mold cavity 91C1 shown in FIG. 13, the newly form strip in the first mold 91 can attach itself to that tag 50T and subsequently to the portion of the strip 10S in the second mold 92. This can be done repeatedly to provide a strip of great length of the fastener cap system. The process can be repeated for the newly formed portion of the strip in the mold 91 such that sealing members can subsequently be added to that portion of the strip in the second mold 92. Molding can be repeated multiple times depending on the application and number of fastener cap systems desired in a particular strip.

Optionally, in some cases the molding operations can be performed such that the second material is introduced into the second mold 92 simultaneously as the first material is introduced into the first mold 91 from the respective sources M2 and M1. In other applications, the materials can be introduced at different times, in the different molds, distal from one another, without the use of any connector tags.

When longer strips of the fastener cap systems are formed, for example, more than 5, 10, 15, 20, 25, 50, 75, 100, 125, or 150 feet, after the strips are completely formed, they can be rolled upon themselves in coils. The end of the strip can be secured to the next layer in the coil so the strip remains in the coiled configuration. From there, the coils can be packaged in corresponding containers for subsequent distribution.

Figure 14:
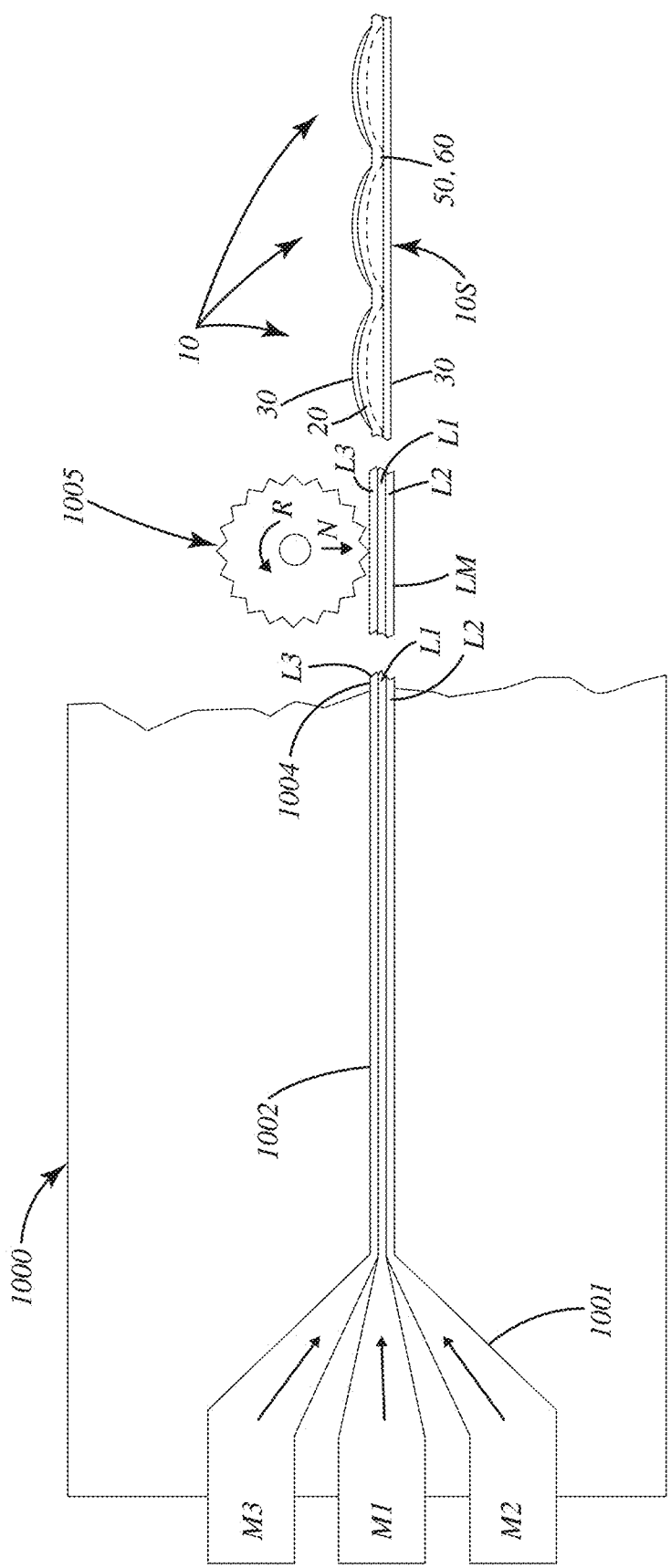
FIG. 14 is a schematic view of an extruder forming a strip of the fastener cap system in a co-extrusion process.
Figure 15:
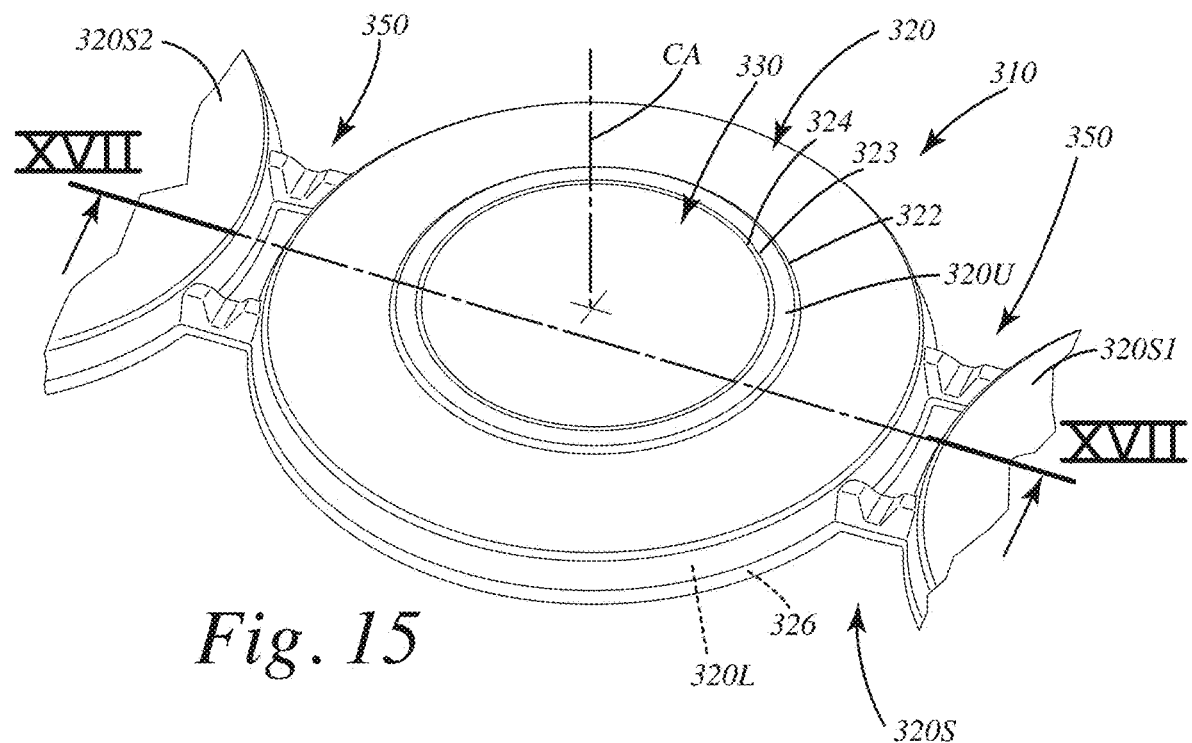
FIG. 15 is an upper perspective view of a third alternative embodiment of the fastener cap system.

In another implementation of the above method of manufacturing the fastener cap systems 10, 110 and/or 210, the system can be formed in a strip or continuous string of multiple fastener cap systems in a co-extrusion process. Such a process is schematically illustrated in FIG. 14. There, a co-extruder machine 1000 can include a first source of material M1, such as a thermoplastic material for the formation of rigid caps, a second source of material M2, such as an elastomeric material for the formation of portions of a sealing members on lower surfaces of rigid caps of the material M1, and a third source of material M3, which can also be an elastomeric material for the formation of portions of sealing members on upper surfaces of rigid caps of the material M3. These materials can be fed to a Y-shaped transition body 101 where the first material in a flowable form interfaces with the second and third materials also in a flowable form. As the first M1, second M2 and third M3 materials flow along the flow channel 1002 of the extruder 1000, the extruder exerts sufficient pressure on the materials until the materials achieve a hardened and or plastic state to form a laminate LM in which a first layer L1 of the first material is chemically and physically bonded to a second layer L2 and third layer L3 of the second material. The second layer and third layer thus can be formed on an upper surface and lower surface of the first material that forms the structural rigid caps in the finished product.

The laminate and its layers move out the exit 1004 of the extruder 1000 and continue to a die or former 1005. As illustrated, that former can be in the form of a roller die that rotates in direction R and can be pressed with a force N against the laminate LM including the layers L1, L2 and L3. When the die or former 1005 engages the laminate LM, it can transform it from a simple two-dimensional web into a strip 10S including the multiple fastener cap systems 10 having the respective rigid caps 20 and sealing members 30, on upper and/or lower surfaces of the caps, connected via connectors 50 and/or 60 as described in connection with the embodiments above. In this construction, however, passageways and sprues connecting the portions of the sealing members on the upper and lower surfaces of the extruded caps can be absent.

A third alternative embodiment of the fastener cap system with another secondary seal ring is shown in FIGS. 15-23 and generally designated 310. This fastener cap system 310 can be similar to the fastener cap systems 10, 110 and 210 described above in structure, function and operation with several exceptions. For example, this fastener cap system 310 can include a rigid cap 320 and a sealing member 330. The rigid 320 can be incorporated into a strip 320S of other rigid caps 320S1 and 320S2 that can be connected via cap connector tabs 350 extending from opposite and distal portions of the respective individual rigid caps 310. The connector tabs 350 can be similar to the connector tabs 50, 51 and 52 as described above. The connector tabs however can be constructed substantially entirely from the material from which the rigid cap is constructed, rather than the material from which the sealing member 330 is constructed. In some applications, portions of the sealing member also can form portions of the connector tabs 350.

Returning to FIGS. 15-17, the rigid cap 320 can include a central portion or central seal 321 that can optionally be in the form of a disc, and can be centered about a central axis CA as described in the embodiments above. The central seal optionally can have a flat, planar disc shape, approximating a circle, ellipsoid, polygon or other geometric shape about the central axis CA. This central seal can be centered on or offset relative to the central axis CA depending on the application. The central seal can extend outward to a recess wall 323 which extends upwardly from the upper surface 321 of the central seal, distal from the lower surface 320L of the central seal 321. This recess wall 323 can transition to an uppermost portion or cap uppermost surface 320U of the cap 320, and/or to the recess wall 323 and/or the cap perimeter flange 322. The perimeter flange 322 can be referred to as a cap perimeter flange or upper flange or generally a flange herein. This flange can surround, circumferentiate and/or extend at least partially around the central axis CA. In some embodiments, the cap perimeter flange 322 can be interrupted but as shown can be a continuous annular ring that extends around the central axis and upward from the cap center 321, which as shown can be in the form of a disc. The cap perimeter flange 322 and generally the rigid cap 320 can include an uppermost portion 320U, which can form a cap uppermost surface. By uppermost surface, this can mean that it is the highest or most upwardly disposed portion of the rigid cap 320 when the cap is on a reference surface RS that is horizontal. It also can be the uppermost portion or surface of the rigid cap 320 that can engage portions of a cap feeder or other installation tool components as described below.

Figure 17:
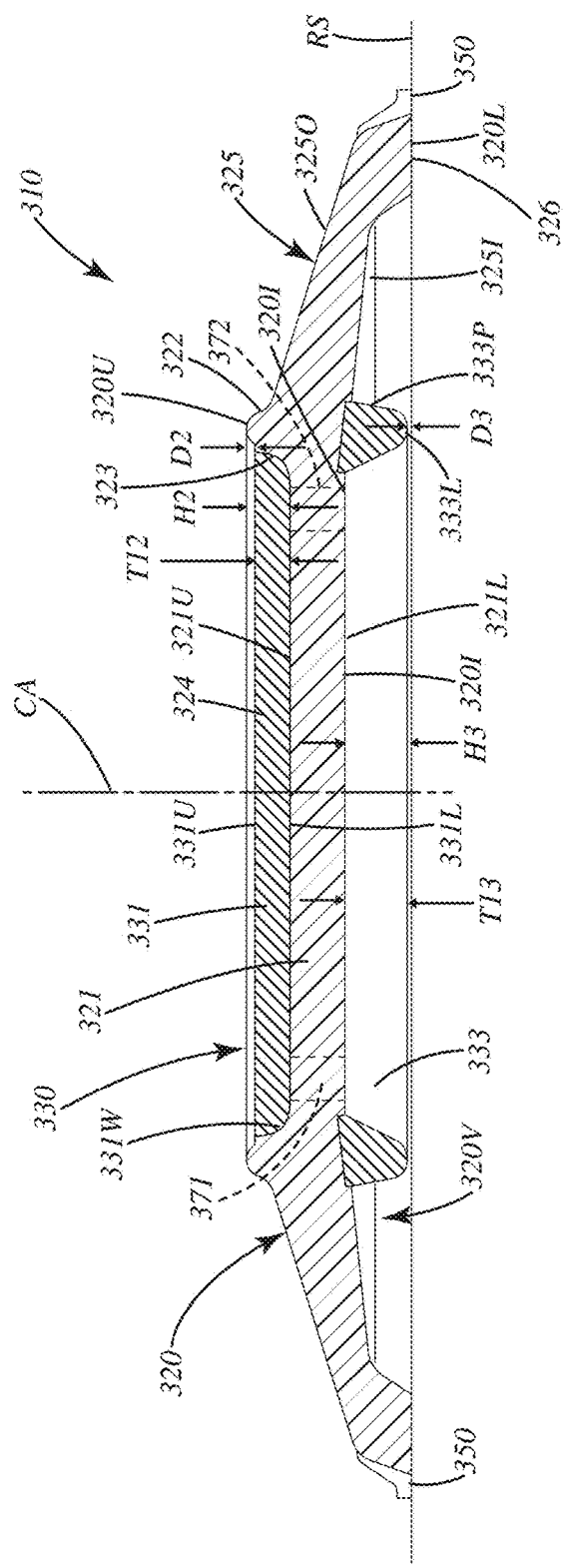
FIG. 17 is a section view thereof.

The cap perimeter flange 322 can transition to the remainder of the cap uppermost surface 320U and can extend toward a cap perimeter ring 325 that surrounds the cap perimeter flange. The ring 325 can generally circumferentiate, surround or extends at least partially around the central axis CA. The ring 325 can include a cap perimeter ring outer surface 325O and a cap perimeter ring interior surface 325I, which can be coextensive with the cap interior lower surface 320I. These surfaces can extend outwardly from the central axis CA toward a cap rim 326. This rim 326 can circumferentiate, surround or otherwise extend around at least a portion of the central axis CA and can be outwardly bound relative to the cap perimeter ring 325 as well as the cap perimeter flange 322 and the central portion 321. This cap rim can include and/or transition to a lowermost portion 320L of the rigid cap. The lowermost portion 320L can form and include the lowest points or parts of the cap when the cap is resting on a reference surface RS that is horizontal. When resting on or placed against the reference surface RS, the cap rim 326 and in particular the lowermost portion 320L of the rigid cap 320 can rest directly on the reference surface RS. This cap rim and the lowermost portion optionally can be the only surface that engages the surface RS when the cap in FIG. 17 is in a preinstalled mode. In contrast, the sealing member 330 as described below, does not contact the reference surface RS with the lowermost surface 320L of the cap, and instead, is separated from that reference surface and on a different level than the lowermost surface. Likewise, if the cap 320 was turned upside down from the configuration shown in FIG. 17 and placed again on the reference surface RS, the uppermost surface 320U of the rigid cap 320 would be in direct contact with the reference surface RS. In this upside down configuration, no portion of the sealing member 330 would contact the reference surface.

Optionally, as with the embodiment above, the cap 320 can form an internal void 320V when the rigid cap is placed adjacent a reference surface, which can be part of a substrate, a barrier layer, a ramp of a tool, or some other surface against which the cap is placed. This internal void can be bounded by the cap rim 326, the interior lower surface 325I, the interior surface of the cap ring 325, as well as the lower surface 320L of the central part 321 of the cap 32.

As mentioned above, this third embodiment of the fastener cap system 310 can be constructed to include a sealing member 330. The sealing member can include multiple components and with each component optionally integrally formed with one another as a monolithic single piece unit, all constructed of a homogeneous material. The material optionally can be the same material used in the sealing member described in the embodiments above. Optionally, the rigid cap 320 and its components can be constructed from a first material having a first coefficient of friction, which coefficient of friction can be static and/or kinetic relative to a particular reference surface. The sealing member 330 can be constructed from a second material having a second coefficient of friction, which generally can be static and/or kinetic, relative to a particular reference surface. The second coefficient of friction can be greater than the first coefficient of friction. For example, the second coefficient of friction for the second material from which the sealing member is constructed can correspond to an elastomeric and/or rubber material positioned on or moved relative to a flat piece of metal, for example, an aluminum or steel element, such as a ramp of a cap feeder 381 in an installation tool 380 as described below. The second material optionally can have a second coefficient of friction, for example, a static coefficient of friction of the sealing member when engaged with metal. This static coefficient of friction can be optionally about 0.5 to about 0.7, inclusive, about 0.6 to about 0.8 inclusive, about 0.6 to about 0.7, inclusive, or about 0.6. The second material optionally can have a dynamic coefficient of friction of the sealing member when engaged with metal. This dynamic coefficient of friction can be optionally about 0.4 to about 0.7, inclusive, about 0.3 to about 0.6, inclusive, or about 0.5 to about 0.7 inclusive.

In contrast, the rigid cap and its uppermost and lowermost portions in particular, can be constructed from the first material, which can have a first coefficient of friction. This first coefficient of friction can correspond to a plastic material positioned on or moved relative to a flat piece of metal, for example, an aluminum or steel element, such as a ramp of the cap feeder 381 in the installation tool 380. The first coefficient of friction of the first material from which the rigid cap is constructed can be a static coefficient of friction of about 0.1 to about 0.6, inclusive. The first coefficient of friction alternatively can be a dynamic coefficient of friction of optionally about 0.05 to about 0.5, inclusive, about 0.1 to about 0.45, inclusive about 0.1 to about 0.3, inclusive, or less than about 0.45, depending on the application. Of course, depending on the specific materials from which the rigid cap and sealing member are constructed, as well as the static or dynamic conditions, and whether or not the materials are dry or lubricated, these first and second coefficients of friction can increase or decrease individually, and/or relative to one another. In most applications herein however, the second coefficient of friction is greater than the first coefficient of friction in all static and dynamic conditions. Generally, this results in the rigid cap 320 sliding or otherwise moving relative to components of a cap feeder within which the cap 310 moves much easier and with less required force when only the portions of the rigid cap, for example the uppermost portion of the lowermost portion thereof, contact the components of the cap feeder, and the sealing member does not contact the components of the cap feeder.

Returning to FIGS. 15-17, the sealing member 330 will be described in further detail. As shown, the sealing member 330 can include a central seal 331, which optionally can be in a disc form and similar to the central seal as described in the embodiments above. The central seal can extend within and can be bounded by a recess 324 disposed radially inwardly from the perimeter flange 322 and the recess wall 323. This recess 324 can be centered on the central axis CA, or in some other orientation relative to that central axis depending on the application. The central seal 331 can extend outwardly to an outer seal wall 331W that is disposed adjacent the recess wall 323. The central seal 331 can include an upper surface 331U and an opposing lower surface 331L. The lower surface 331L can be disposed against and can contact the upper surface 321U of the central portion 321 of the rigid cap 320. Optionally, the central seal 331 can be molded directly to, cemented to, adhered to otherwise joined with the rigid cap within the recess 324, and can contact the central portion 321 of the cap.

As can be seen with reference to FIG. 17, the seal 331 can have a thickness T12 that is less than the height H2 of the recess 324 and less than the height H2 of the wall 323 adjacent the recess or forming a portion of the cap perimeter flange 322. In this configuration, or in other configurations, the upper surface and uppermost surface 331U of the central seal 331 can be disposed a distance D2 below the uppermost surface 320U of the cap 320 and/or the cap perimeter flange 322. Accordingly, with this spatial differential or gap, the upper surface 331U of the seal 331 optionally does not extend beyond or above the uppermost surface. Further, the sealing member 330 and in particular the seal 331 does not form the uppermost portion of the fastener cap system 310. Instead, the uppermost portion of the system 310 is the uppermost portion 320U of the cap 320. Again, as will be discussed further below, this results in that uppermost portion 320U of the cap being the portion of the system 310 that engages any components of the cap feeder 381, which can result in low friction being exerted on or experienced by the cap system 310 as it moves along the cap feeder as also described below.

Figure 16:
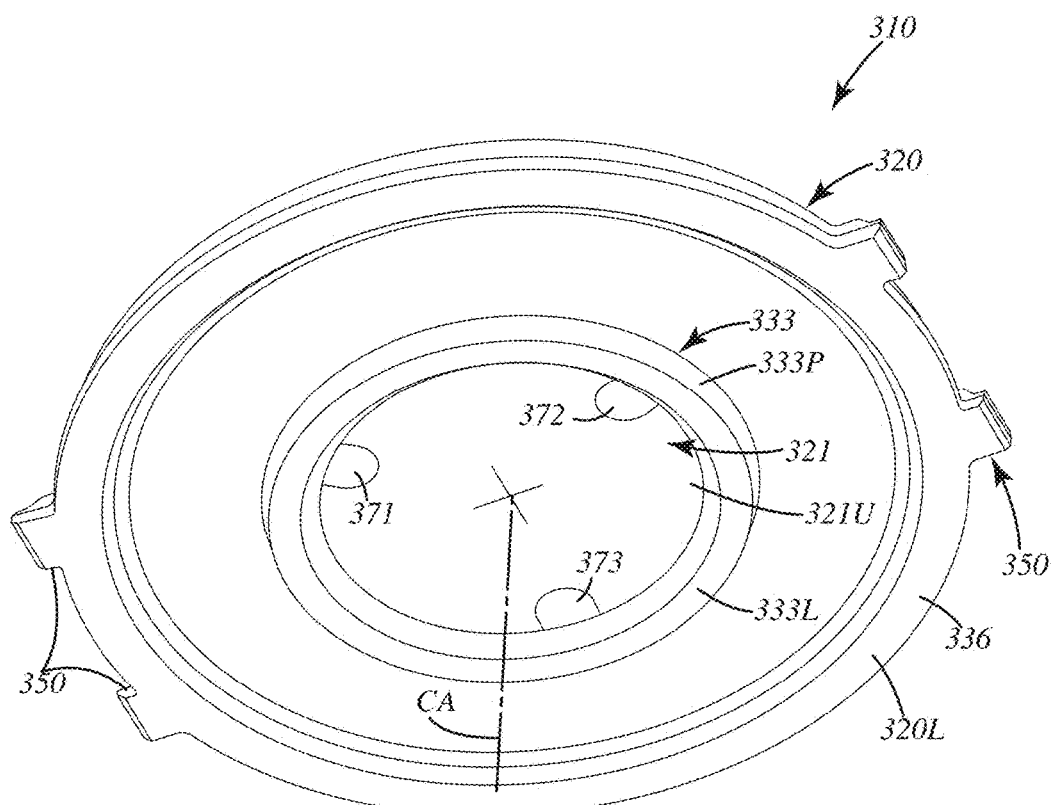
FIG. 16 is a lower perspective view thereof.

With further reference to FIG. 17, the sealing member 330 can include a secondary seal 333 that extends downward from the interior surface of the cap 320 and in particular the central seal lower surface 321L and/or the interior surface 325I of the cap perimeter ring 325. As can be seen there, the secondary seal 333 can be adjacent to the interior lower surface 320I of the rigid cap 320. The secondary seal 333 can be bounded by a secondary seal perimeter 333P and optionally can be in the form of an annular ring as shown in FIGS. 16-17. Of course, the secondary seal 331 can take on other shapes and configurations. As an example not shown, the secondary seal 331 can alternatively be in the form of a disc as well. The secondary seal perimeter 333P can extend farther radially outward from the central axis CA than the recess wall 323 and the outer seal disc wall 331W. In other applications, the disc can extend farther from the central axis than the secondary seal perimeter 333P.

As further shown in FIGS. 16 and 17, the secondary seal 333 can include a secondary seal lowermost surface 333L. This lowermost surface 333L can be disposed a distance D3 above the cap lowermost surface 320L and generally the cap rim 326. In this manner, when the cap is placed on the reference surface RS as shown in FIG. 17, it results in the lowermost surface of the secondary seal 333L being disposed a distance D3 above the reference surface RS, while the lowermost surface 320L of the cap as well as the cap rim 326 lays on and/or engages the surface RS. This spacing of the lowermost surface 333L of the secondary seal can be helpful to ensure that the secondary seal and the material thereof do not engage a reference surface RS upon which the cap system 310 is moving. Instead, only the lowermost portion 320L of the cap 320 and/or the cap rim 326 engages that surface RS, which as described further below can be a portion or component of a cap feeder. In turn, the higher friction secondary seal 333 material does not slow down or impair movement or sliding action of the cap system 310 along the surface RS or feeder component, particularly in a preinstalled mode of the cap system 310 which again is shown in FIG. 17.

The secondary seal 333 can include a thickness T13 as it extends downwardly from the lower surface lower interior surface 320I of the cap 320. This thickness T13 optionally can be less than the height H3 of the cap 320 generally from the interior surface 320I to the same level as the lowermost surface portion 320L of the cap 320 adjacent the central axis CA. As a result of this differential, again, the cap rim 326 and the lowermost portion 320L of the cap 320 can extend the distance D3 below the lowermost portion 333L of the secondary seal 333. As shown in FIG. 16, that lowermost surface 333L can circumferentiate the central axis CA of the cap system 310 and likewise can circumferentiate the fastener that is advanced along or near that central axis CA when the cap system is in an installed mode shown in FIG. 21 and described below.

Figure 20:
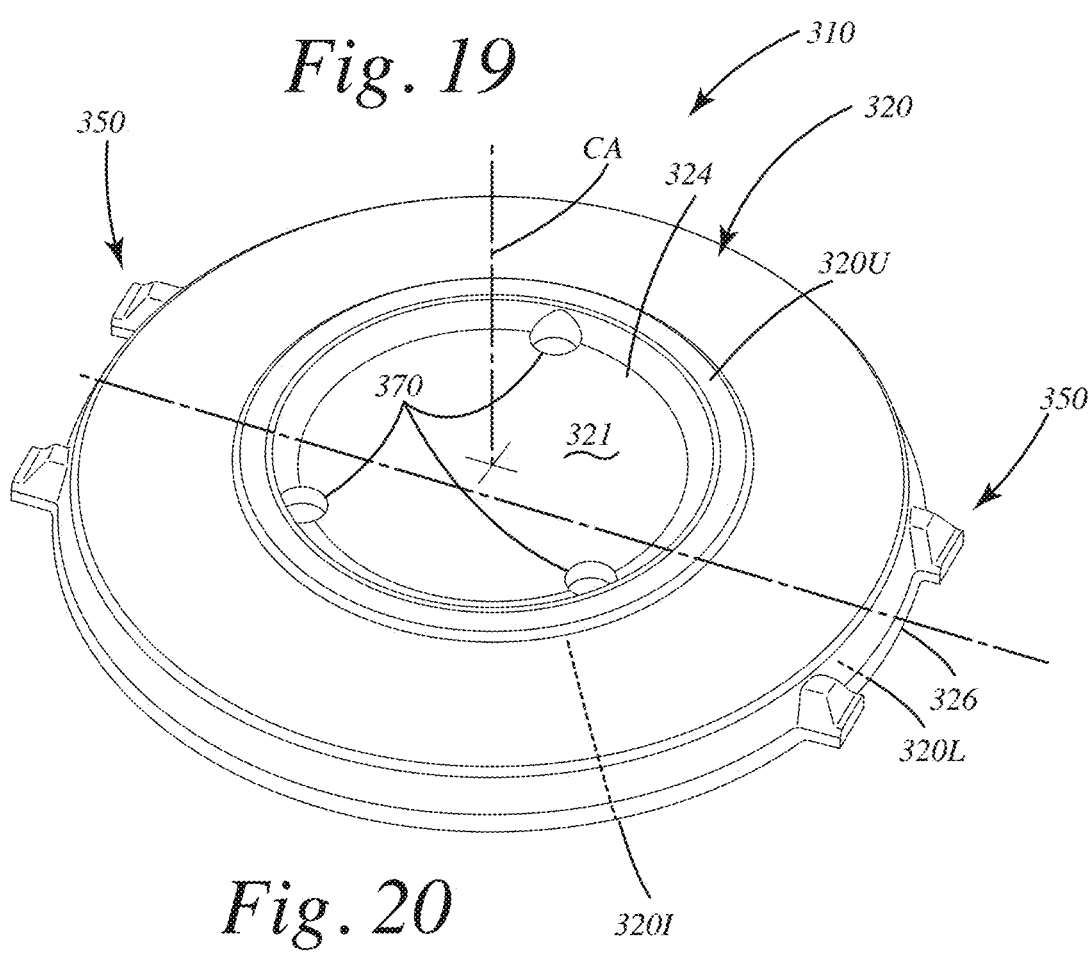
FIG. 20 is an upper perspective view of the third alternative embodiment of the fastener cap system before a sealing member is installed relative thereto.

With reference to FIGS. 17 and 20, the rigid cap 320 can define one or more passageways 370 that extend from an upper surface of the rigid cap 320 to an interior lower surface 320I of the cap. These passageways 370 can be similar to the passageways 70 described in connection with the embodiments above. These passageways 370 can be configured to house, confine and/or form one or more sprues 371, 372, 373 of the sealing member 330 that can optionally connect and join the sealing disk 331 with the secondary seal 333. Similar to the embodiment above, this can result in these components all being part of a monolithic one piece body that forms the sealing member. The material that forms the seal 331, the secondary seal 333 as well as the sprues 371, 372, 373 etc., all can be the same homogeneous material. This material can flow through the rigid cap and in particular, the passageways from one surface to an opposing surface when the sealing member is injection molded, formed, or otherwise joined with the rigid cap 320. Of course, in other applications where the sealing member includes a separately formed sealing disc 331 and a secondary seal 333, these elements can be glued, adhered, bonded, molded, fused or otherwise joined with the respective surfaces of the cap. For example, the seal and secondary seal can be molded directly to the upper and/or lower surface of the cap, or glued or otherwise secured to those surfaces, without being joined via sprues or other common structures through the cap.

Figure 18:
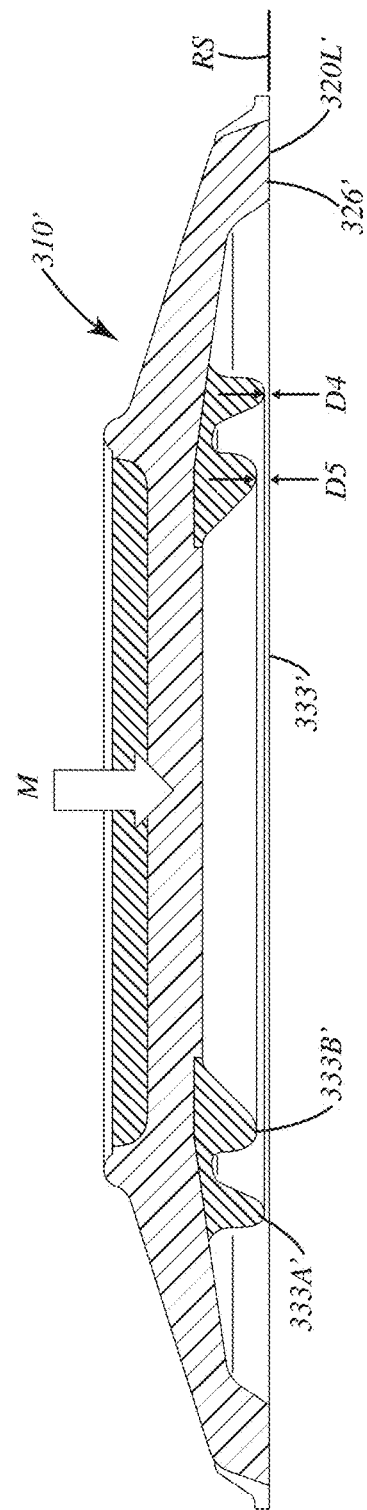
FIG. 18 is a section view showing a modification of a secondary seal of the third alternative embodiment of the fastener cap system.
Figure 19:
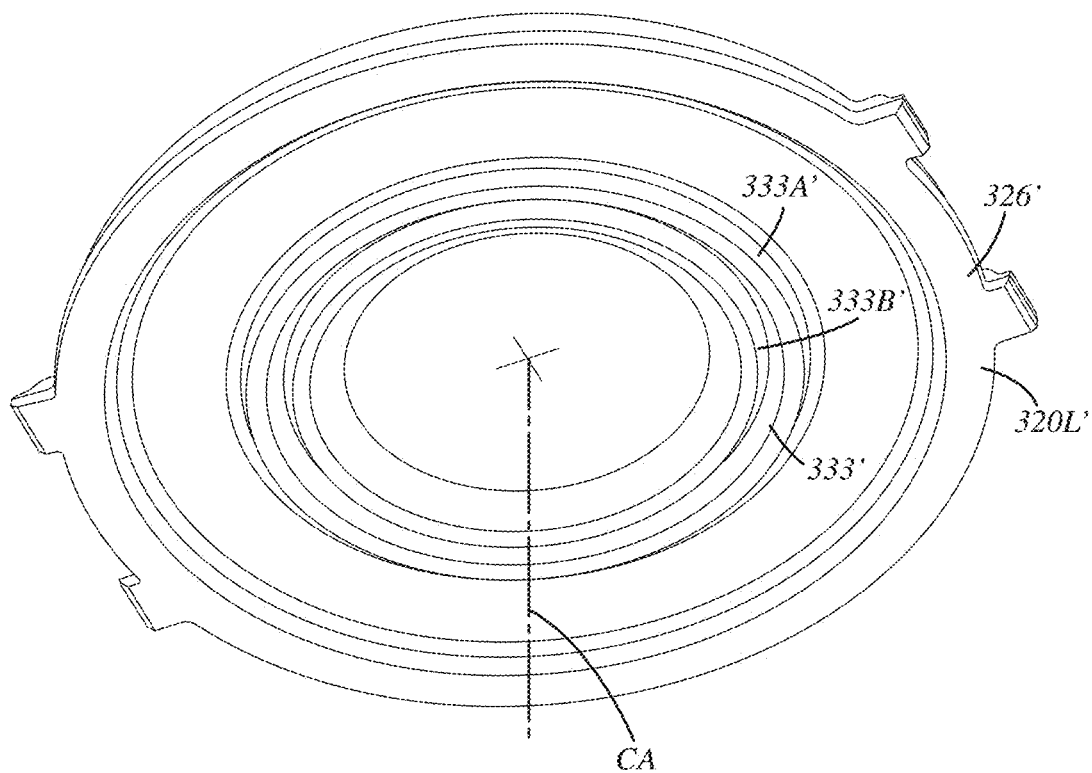
FIG. 19 is a lower perspective view thereof.

As shown in FIGS. 16 and 17, the secondary seal 333 is in the form of a single annular ring that extends around and surrounds the central axis CA. In some applications, this secondary seal 333 can be slightly modified to include concentric rings. For example, as shown in FIGS. 18-19, the modified secondary seal 333' can include concentric, annular seal rings 333A' and 333B'. These concentric rings optionally can be spaced different distances D4 and D5 from a reference surface RS when the cap system 310' is placed on that surface RS. Of course, when the cap system 310' is penetrated by a fastener as described below, and deforms downward in direction M, these distances D4 and D5 can decrease until one or both of the rings 333A' and 333B' are moved downward and engage the surface RS simultaneously with the cap rim 326' and the lowermost surface 320L' of the cap system 310'. It will further be appreciated that any number of concentric rings can be added to the secondary seal 333' of the construction shown in FIGS. 18 and 19. Further, although not shown, the entire secondary seal can be in the form of a solid disc of a uniform thickness extending across the interior surface of the cap system 310'.

Figure 21:
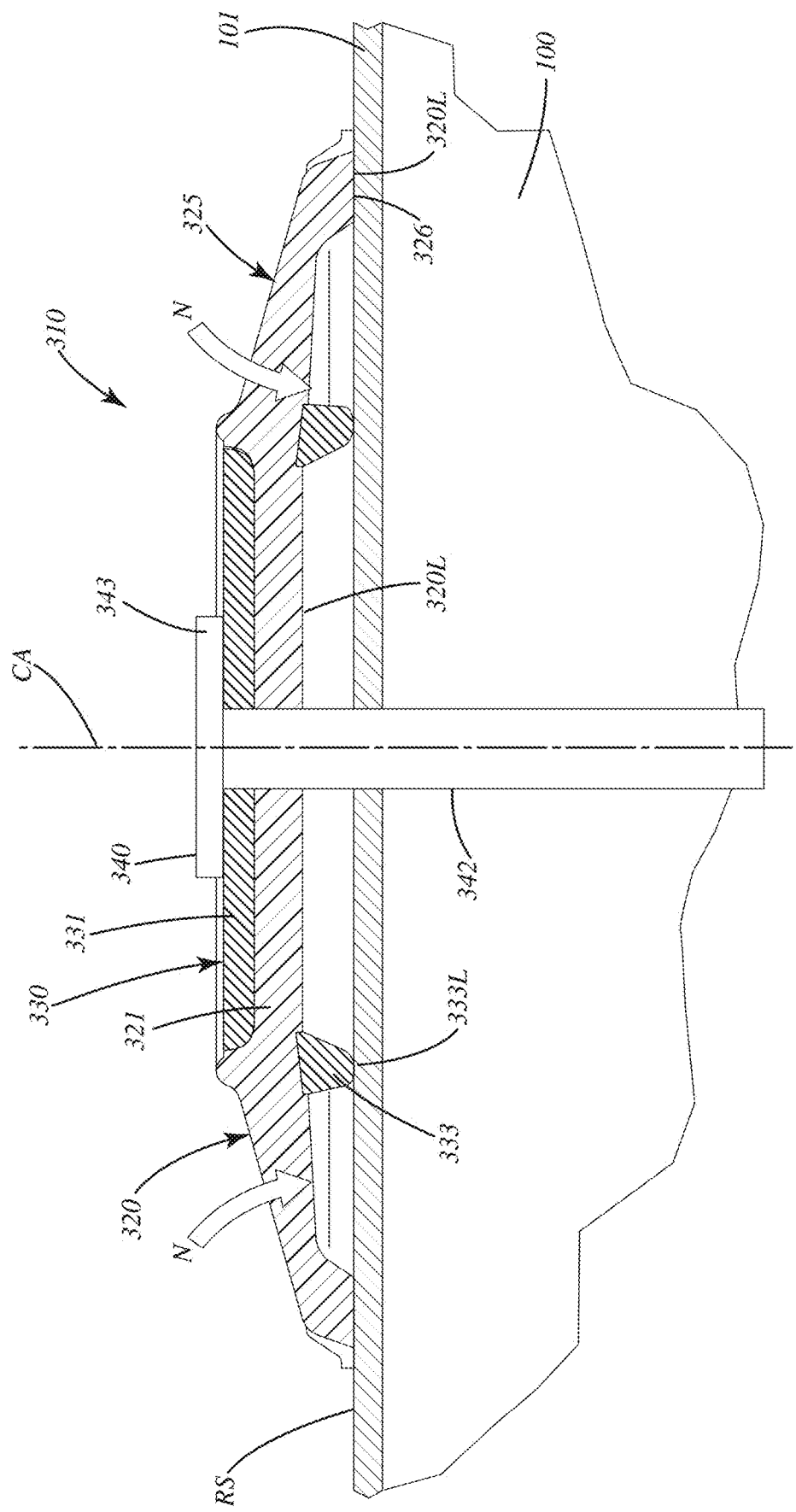
FIG. 21 is a section view showing a rigid cap and a sealing member penetrated by a fastener, with the fastener cap system of the third alternative embodiment in an installed mode, and the sealing member engaging a substrate and at the same level as a lowermost portion of the rigid cap.

With reference to FIG. 21, the cap system 310 will be described briefly in an installed mode. There, in the installed mode, the cap system 310 is installed with a fastener 340 relative to a substrate 100 optionally with a barrier layer 101. That substrate and barrier layer can be similar to those described in the embodiments above. When the cap system 310 is installed with the fastener 340, the tip of the faster and shaft 342 can penetrate through the central seal 331 and central part 321 of the cap 320, and exit out the lower interior surface 320I of the rigid cap 320. The tip and shaft 342 can also penetrate the optional barrier layer 101 as well as a substrate 100. As the fastener 340 continues to move generally along or near the central axis CA of the cap system 310, eventually the head 343 of the fastener 340 engages the central seal 331 and/or the central portion 321 of the rigid cap 320.

As the fastener 340 further advances, its head 343 eventually engages and pushes the cap system 310 against the barrier and substrate, generally including the reference surface or plane RS. As this occurs, the lowermost portion 320L of the cap and the cap rim 326 engage the reference surface, for example, the barrier layer 101 and/or the substrate 100 to engage the cap system 310 against those components. Further, as the fastener 340 continues to advance, the rigid cap 320, and for example, the cap perimeter ring 325 flexes inward in directions N, which causes the secondary seal 333 to move downward toward the reference surface RS. That surface, again, can be a horizontal surface, vertical surface or some other surface and/or portion of the barrier layer 101 or the substrate 100. When this occurs, the lowermost portion 333L of the secondary seal 333 moves toward and engages the reference surface RS, which again can be the barrier layer substrate 100. The secondary seal 333 and rim 326, and/or the lowermost portion 320L of the cap 320, can all simultaneously engage the reference surface RS. As a result, the secondary seal 333 can effectively seal against that reference surface RS around the central axis CA and around the fastener shaft 342 and fastener 340 in general. As a result, liquids and/or moisture is prevented or impaired from seeping under the rim 326 and passing by that secondary seal 333, in particular the lowermost surface 333L that engages the reference surface RS, and into the hole created by the shaft 324 or generally to the fastener 340. Of course, in other embodiments, such as that shown in FIGS. 18 and 19, the lowermost surfaces of each of the rings 333A' and 333B' of the secondary seal 333' there can likewise engage the reference surface RS, which again can include the barrier layer 101 and/or the substrate 100, to form multiple seals around the fastener 340 and the hole in the barrier and substrate within which the shaft 342 is disposed.

It will be noted here that the installed mode of the cap system 310 shown in FIG. 21 can be different from the preinstalled mode of the cap system 310 shown in FIG. 17. Again, the primary difference can be that in FIG. 17, before the cap system is installed, the secondary seal 333, and generally the sealing member 330, is disposed some distance D3 above the level of (for example a plane coincident with) the lowermost surface 320L of the cap and/or the cap rim 326. Accordingly, the cap system 310 can slide or move along a reference surface RS without the sealing member 330, for example, the secondary seal 333 engaging that reference surface RS, which otherwise could impair such movement due to its optionally higher coefficient of static and/or sliding or dynamic friction. Instead, as shown in FIG. 17, the cap lowermost surface 320L and/or the cap rim 326 are what engage the reference surface RS. Because these components are part of the rigid cap 320, which is made of another material having a lower coefficient of friction, static and/or dynamic, the cap system 310 slides easily and efficiently along the reference surface RS, which again can form a portion of a cap feeder of an installation tool as described below. When the cap system 310 is installed with a fastener 340 relative to a substrate 100, however, as shown in FIG. 21, in an installed mode, the sealing member 330 can effectively be moved toward and to the level of the cap lowermost surface portion 320L and/or the cap rim 326 of the cap system 310 to take on a sealing function and provide a sealing barrier around the fastener, inward from the cap rim and lowermost surface, nearer to the central axis. In particular, in the installed mode shown in FIG. 21, the sealing member 330 can be actuated and brought into contact with the reference surface RS, which again can correspond to the barrier layer 101, the substrate 100 and/or another surface. In so doing, the lowermost surface 333L of the secondary seal 333 engages and seals against that reference surface to create the liquid barrier under the rigid cap 320. The sealing member is movable relative to the cap rim 326 so that in the installed mode, the sealing member can be at a common level or plane with the lowermost surface 330L and/or rim 326. Of course, where the sealing member 330 includes the upper sealing member or portion 330, that portion 330 also can seal against the underside of the head 343 and the shaft 342 of the fastener 340. As a result, a water or liquid barrier is formed above the central cap part 321 as well as below that central cap part 321, generally around the shaft 342 of the fastener 340.

A method of using the fastener cap system 310 of the third alternative embodiment application will now be described with reference to FIGS. 22-23. On a high level, the method can include providing a plurality of rigid caps 311, optionally configured in a collated strip 320S connected via connector tabs 350, each rigid cap 320 including a cap uppermost surface 320U and a cap lowermost surface 320L, each rigid cap bounded by a cap rim 326, each cap rim 326 joined with an adjacent cap rim of an adjacent rigid cap via a cap connector 350, each rigid cap joined with a sealing member 330, the sealing member being disposed above the cap lowermost surface 320L and below the cap uppermost surface 320U in a pre-installation mode (shown in FIG. 23, for example); and moving the plurality of rigid caps 311 along a cap feeder 381 of an installation tool 380 toward a driving station 382 such that at least one of the cap lowermost surface 320L and the cap uppermost surface 320U slidably engages the cap feeder 381, but the sealing member 330 does not engage the cap feeder 381 in the pre-installation mode.

Optionally, as mentioned above, the rigid caps 320 can be constructed from a first material having a first coefficient of friction, and the sealing member 330 can be constructed from a second material having a second coefficient of friction that is greater than the first coefficient of friction. As described further below, due to this difference in coefficient of friction, with the first coefficient of friction, static or dynamic, being less than the second coefficient of friction, static or dynamic, with only the lowermost and/or uppermost portions of the cap engaging components of the cap feeder 381, the plurality of caps 311, optionally in a strip form shown in FIG. 23, slides and moves easily and efficiently relative to the components of the cap feeder 381. Conversely, the sealing member 330, having the second coefficient of friction that is greater than the first coefficient of friction, optionally does not contact, engage or otherwise slide along the components of the cap feeder 381, which in turn prevents the sealing member from slowing down the progression of the caps in the strip 311, or otherwise hindering their progress toward a driving station via enhanced friction between the sealing members and the reference surface RS, ramp 381R or other components of the cap feeder 381.

Further optionally, the method can include sequentially penetrating each of the rigid caps 310 and the respective sealing members 330 with a respective fastener, thereby pressing each cap rim 326 and each sealing member 330 against a substrate 100, barrier layer 101 and/or reference surface RS in an installed mode, as shown for example in FIG. 21, which is described above.

Yet further optionally, the method can include installing each rigid cap 310 relative to a substrate by penetrating each rigid cap and respective sealing member with a fastener 340, as shown and described in connection with FIG. 21. As mentioned above, each sealing member 330 can include a secondary seal 333 disposed on a lower surface of each rigid cap, but above the lowermost portion 320L of the cap in the pre-installation mode. The rigid cap 320 can be deformed during the installing so that the secondary seal 333, in particular the lowermost portion 333L is moved to a position where it is flush with the cap lowermost portion 320L when the rigid cap is in an installed mode, thereby forming a seal around a fastener 340 extending through the rigid cap 320, and the sealing member 330 adjacent the substrate 100, barrier layer 101 and/or reference surface RS.

Figure 22:
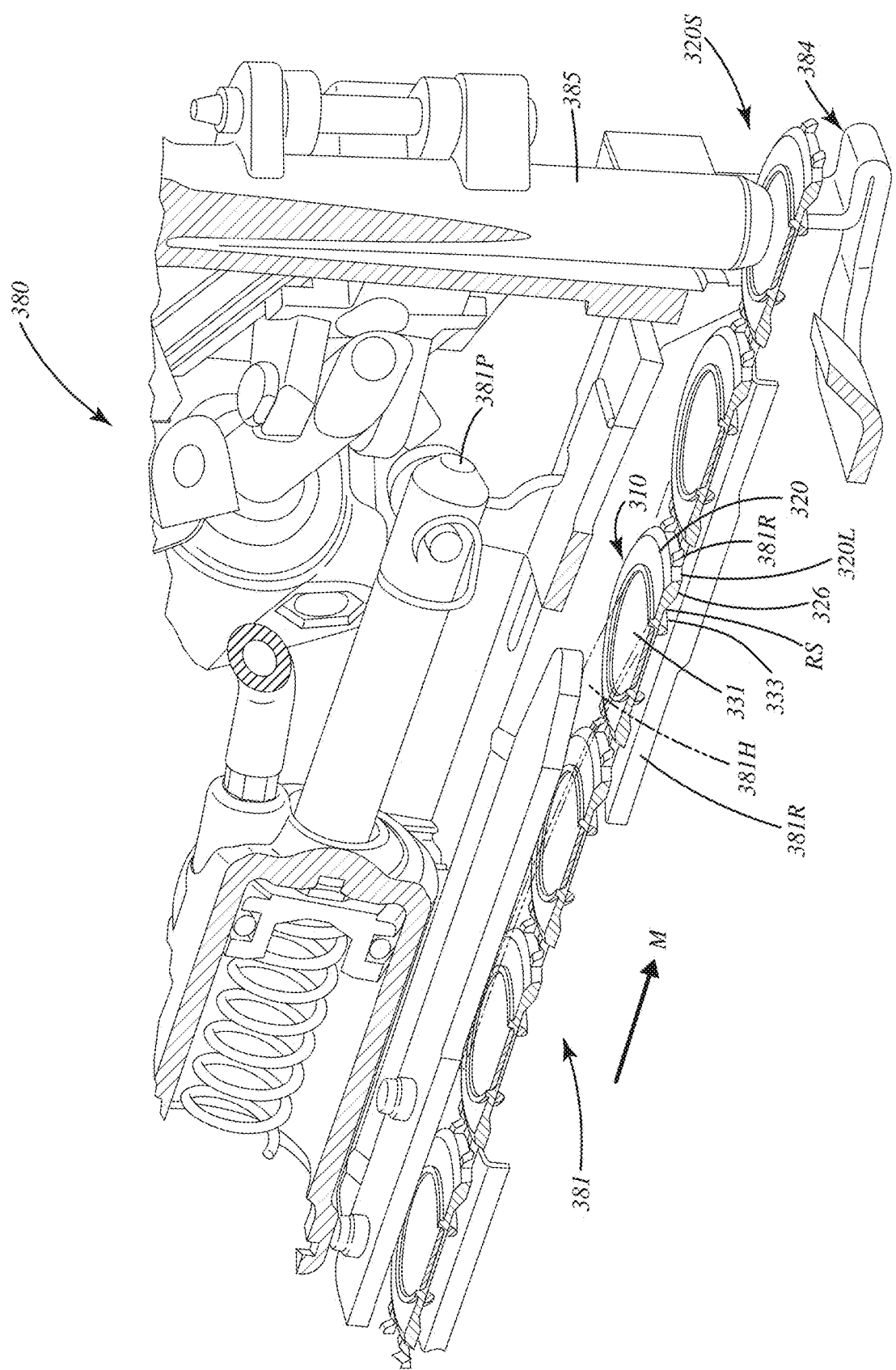
FIG. 22 is a side section view of a strip of the fastener cap system of the third alternative embodiment moving along a cap feeder of an installation tool to a driving station or installation station of the tool.

With further reference to FIG. 22, the multiple caps 310 in the form of the collated strip 320S can be applied via an installation tool 380. This installation tool can include a cap feeder 381 that feeds the strip of caps sequentially toward a driving station 384. At the driving station 384, individual fasteners are driven one by one through a nose 385 of the tool 380 to sequentially penetrate each individual cap 310 and install that individual cap, with the fastener in a substrate as described above. As mentioned above as well, the installation tool 380 can be any of those mentioned in the patents referred to herein.

Optionally, the cap feeder 381 can include a ramp 381R and a hold down arm 381H. The strip 320S can slide along the ramp 381R toward the driving station 384. The hold down arm 381H can hold down individual ones of the caps positioned and advancing in the cap feeder 381. Although not shown in significant detail, a pusher 381P can reciprocally engage, push and/or pull the strip 320S to move the strip 320S within the cap feeder 381.

Figure 23:
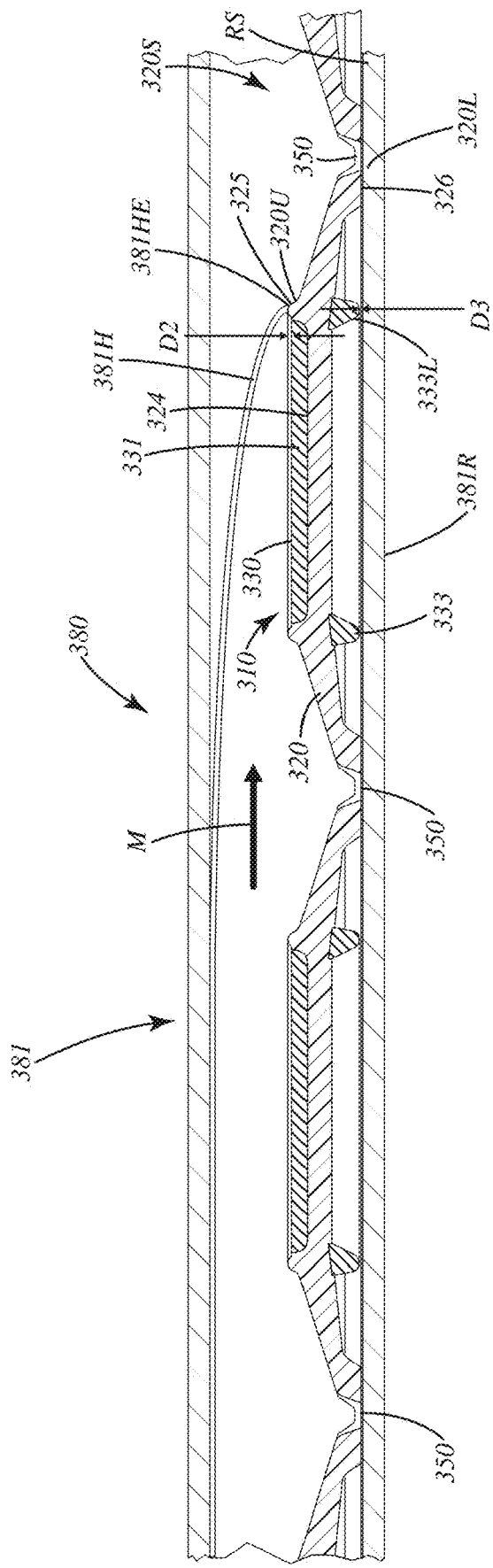
FIG. 23 is a side section view of the strip of the fastener cap system of the third alternative embodiment in a pre-installation mode moving along the cap feeder of an installation tool such that the uppermost end lowermost portions of the rigid cap move relative to a ramp and a hold down arm of the cap feeder, without the sealing member engaging the same.

As shown further in FIGS. 22 and 23, the strip 320S and the individual caps 310 of the strip with the respective rigid cap 320 and sealing member 330, can be well suited to move in direction M along the ramp 381R, sliding relative to that ramp. In particular, each individual cap system 310 can include the rigid cap 320. The rigid cap can include the uppermost surface 320U and the lowermost surface 320L as described above. The uppermost surface 320U and the lowermost surface 320L can directly engage the components of the cap feeder 31, and optionally can be the only components to the caps 310 that engage the cap feeder 381. In particular, the hold down arm 381H can directly engage the uppermost surface 320U and/or the cap perimeter flange 325 as the individual cap system 310 moves past that component of the cap feeder. During this motion, that is, the sliding or general movement of the uppermost surface 320U of the rigid cap 320 past or along the hold down arm 381H, that uppermost surface is substantially the only surface that contacts that hold down arm. Accordingly, with its low coefficient of friction, the rigid cap 320 slides and moves smoothly and efficiently relative to that hold down arm 381H while engaging it. As it does so, the forward edge 381HE can slide along or over portions of the cap perimeter flange 325 and uppermost portion 320U of the cap 320. This edge and the hold down arm 381H, however, do not contact the sealing member 330, for example the central seal 331 atop the cap 320 because that seal 331 is disposed in the recess 324 of the rigid cap 320 and disposed the distance D2 below the uppermost portion 320U of the rigid cap 320. As a result, the sealing member, with its higher coefficient of friction, does not slow down or otherwise impair movement of the cap system 310 and the strip 311 in general with friction relative to the hold down arm 381H. Optionally, the sealing member 330 and more particularly the upper seal 331 does not contact or directly engage the edge 381H of the hold down arm 381H throughout the entire movement of the rigid cap 320 past those components.

As further shown in FIG. 23, when the sealing member 330 includes a secondary seal 333 that is disposed on the underside of the rigid cap 320, as mentioned above, that secondary seal 333 and in particular its lowermost portion 333L can be disposed a distance D3 above the ramp 381R upon which the strip 311 and the individual caps 310 slide or move along. Generally, the surface of the ramp 831R can be referred to as a reference surface RS. The lowermost portion 320L of the rigid cap 320, and for example the cap rim 326, can directly engage and slide or move in direction M along that reference surface RS on the ramp 831R. Thus, with its lower coefficient of friction than the sealing member, the cap rim and lowermost portion 320L can slide or otherwise move with ease and low friction along that reference surface RS. Again, in this pre-installation mode, when the cap system 310 is moving along the reference surface RS, and the ramp 381R in general, the sealing member 330, and in particular the lowermost portion 333L of the sealing member does not engage or contact or slide along that reference surface RS due to the spacing of the distance D3. This distance D3 can be optionally at least 0.001 inches, at least 0.01 inches, at least 0.05 inches, at least 0.10 inches, at least 0.15 inches, at least 0.20 inches or other distances sufficient to ensure that the sealing member, in particular the secondary seal 333, does not contact and drag along the reference surface RS of the ramp, or generally slow down or impair movement of the strip and individual caps in direction M.

With further reference to FIG. 23, the individual cap system 310 can move along with the strip 320S of other caps. As it moves in direction M, a rigid cap 320 can simultaneously engage the hold down arm 381H above the rigid cap 320 and the ramp 831R with its reference surface RS, below the rigid cap 320. Further, the cap uppermost surface 320U and cap perimeter flange 322 can engage the hold down arm, while the cap rim 326 and lowermost surface 320L engage the ramp and reference surface RS. During this engagement, the sealing member 330 remains disengaged from both the hold down arm and the reference surface RS because it is spaced the respective distances D2 and D3 from those components of the cap feeder 381. The individual cap 310 can move past the entire hold down arm 381H and along the entire length of the ramp 831R without the sealing member coming into contact with the hold down arm or the ramp. Again, where the sealing member is a higher coefficient of friction than the components of the rigid cap, this in turn can allow the strip and individual caps to slide easily along the ramp and the cap feeder in general, due to the lower coefficient of friction of the rigid cap which contacts the components thereof, while the caps 310 are in the pre-installation mode, moving along the cap feeder. It will be appreciated that a cap system 310 can be in a pre-installation mode simply sitting along any reference surface RS, not necessarily loaded in a cap feeder or installation tool.

Figure 24:
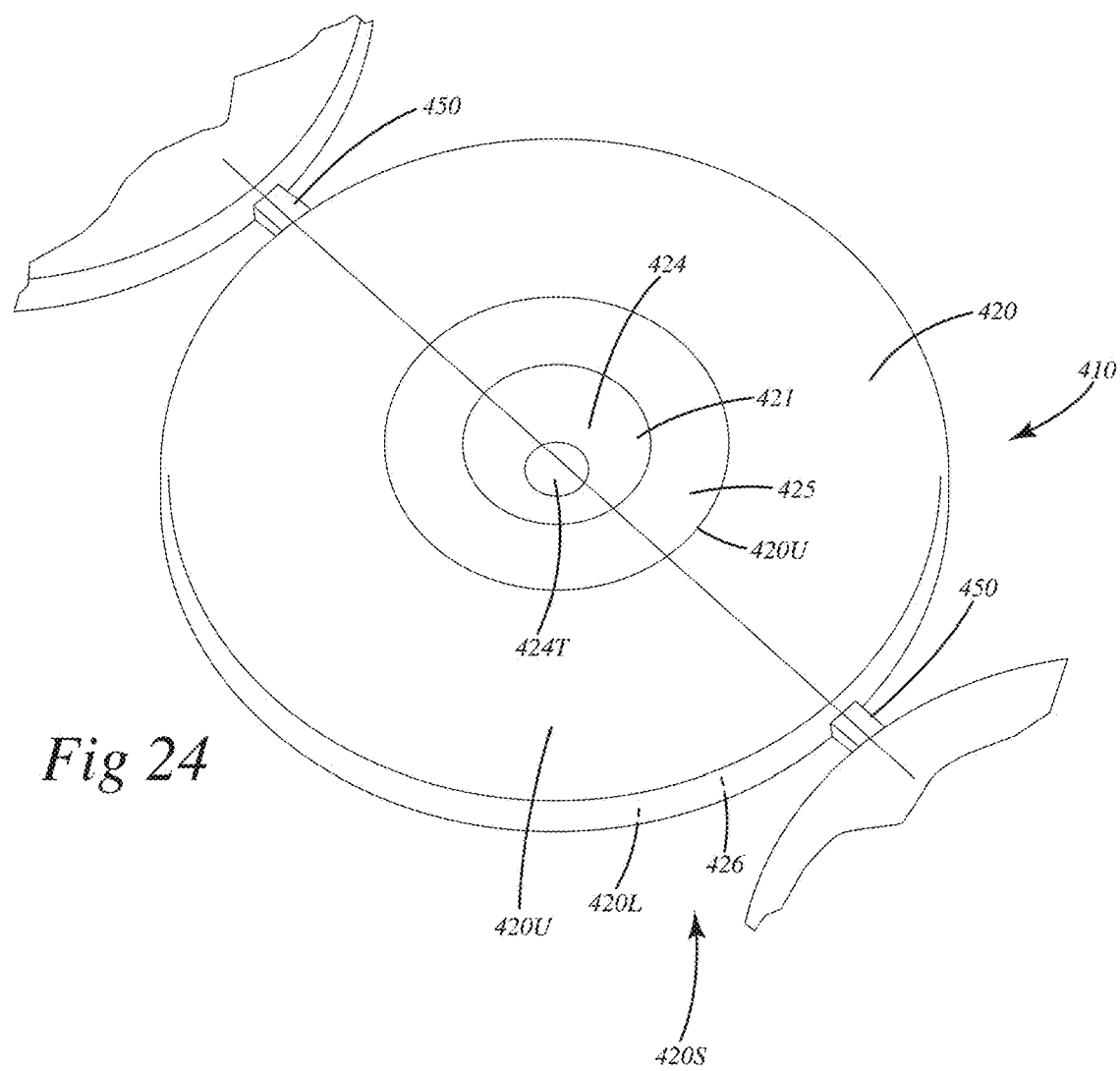
FIG. 24 is an upper perspective view of a fourth alternative embodiment of the fastener cap system.

A fourth alternative embodiment of the fastener cap system is shown in FIG. 24 and generally designated 410. This fastener cap system 410 can be similar to the fastener cap systems 10, 110, 210 and 310 described above in structure, function and operation with several exceptions. For example, this fastener cap system 410 can include a rigid cap 420 and a sealing member 430. The rigid cap 420 can be incorporated into a strip 420S of other rigid caps that are connected via cap connector tabs 450 that extend from and opposite and distal portions of the respective individual rigid caps. These connector tabs 450 can be similar to the connector tabs 50, 51 and 52 as described above. These connector tabs however can be constructed substantially entirely from the material from which the rigid cap is constructed, rather than the material from which the sealing member 430 is constructed. Of course other applications, portions of the sealing member also conform portions of the connector tabs 450.

Figure 27:
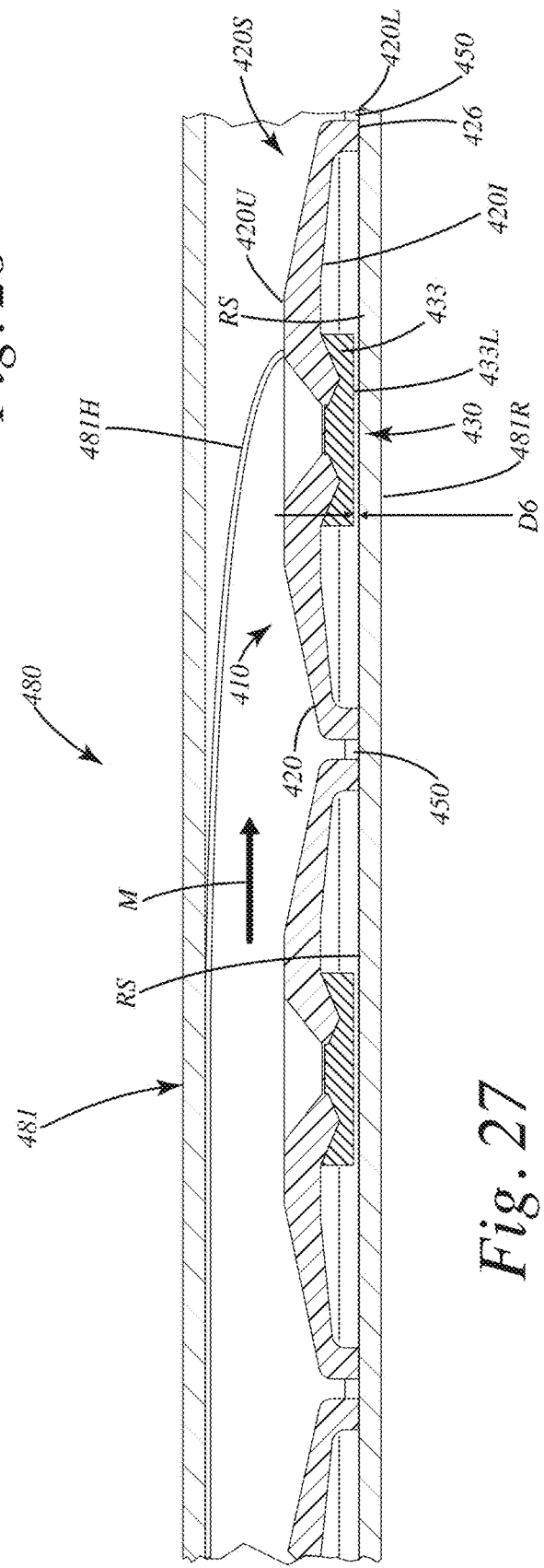
FIG. 27 is a side section view of the strip of the fastener cap system of the fourth alternative embodiment in a pre-installation mode moving along the cap feeder of an installation tool such that the uppermost end lowermost portions of the rigid cap move relative to a ramp and a hold down arm of the cap feeder, without the sealing member engaging the same.

In this embodiment, however, the sealing member and rigid cap can differ from the embodiments above. In particular, as shown in FIG. 24, the rigid cap 420 can include a central portion 421 that defines a recess 424. This recess 424 can be in the form of a frustoconical, cylindrical, rounded or polygonal shaped recesses. The recess can be formed to get the tip of a fastener into the target penetration area for 424T at the bottom of the recess 424. The recess 424 can be bounded by a cap perimeter flange 425 that extends around the recess. Like the embodiment above, the rigid cap 420 can include an uppermost surface 420U. This cap uppermost surface 420U can be the uppermost portion of the cap and can engage a cap feeder hold down arm 481H, or any other component of a cap feeder 481 above the strip 420S as shown in FIG. 27. The rigid cap 420 in this embodiment also can be constructed from the first material having a lower coefficient of friction, static and/or dynamic, than the coefficient of friction of the sealing member 430 of this embodiment. In this manner, the cap system 410, when moving relative to the feeder 481, can slide easily and well past or along the respective components of the cap feeder, including the hold down arm 481H well as the reference surface RS of the ramp 481R in the preinstalled mode shown in FIG. 27.

Figure 25:
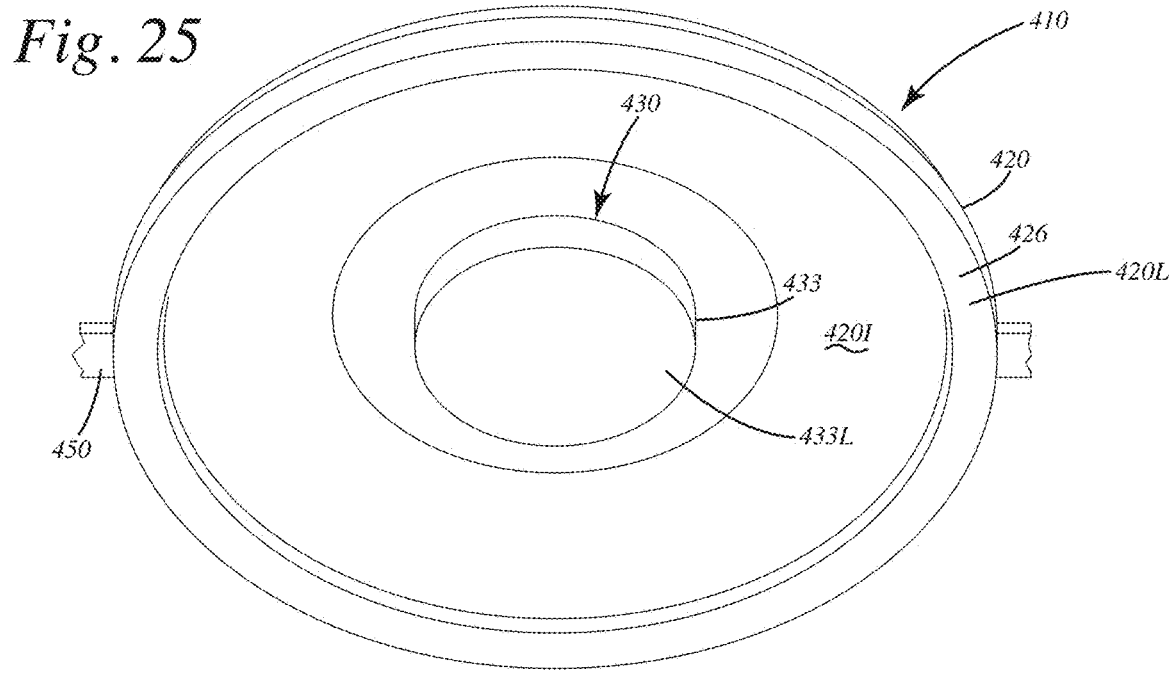
FIG. 25 is a lower perspective view thereof.

In this embodiment, the sealing member 430 as shown in FIG. 25 also can differ from the sealing member of the embodiments above, being located substantially only on the lower interior surface 4201 of the rigid cap 420. The sealing member 430 can be in the form of a secondary seal 433 that is of a disc like shape. The lower most surface 433L optionally can be of a rounded or disk shape or of a planar form. The lowermost surface 433L can be spaced a distance D6 from the reference surface or plane RS. This lowermost surface 433L also can be spaced a distance D6 above the level upon which the lowermost surface 420U of the rigid cap and generally the cap rim 426 are located. Again with this configuration, the cap rim 426 of the lowermost portion 420U can engage the reference surface RS, while the cap 410 is resting upon or moving along that reference surface RS. However, the sealing member 430 remains at the distance D6 from that reference surface during such movement or placement. Accordingly, where the sealing member 430 is constructed from a material of a higher coefficient of friction than the rigid cap 420 to which is attached, that sealing member does not impair or add additional friction to slow down movement of the cap system 410 or generally the strip 420S of the caps as they move in direction M along the ramp 481R and/or the reference surface RS of that ramp.

Figure 26:
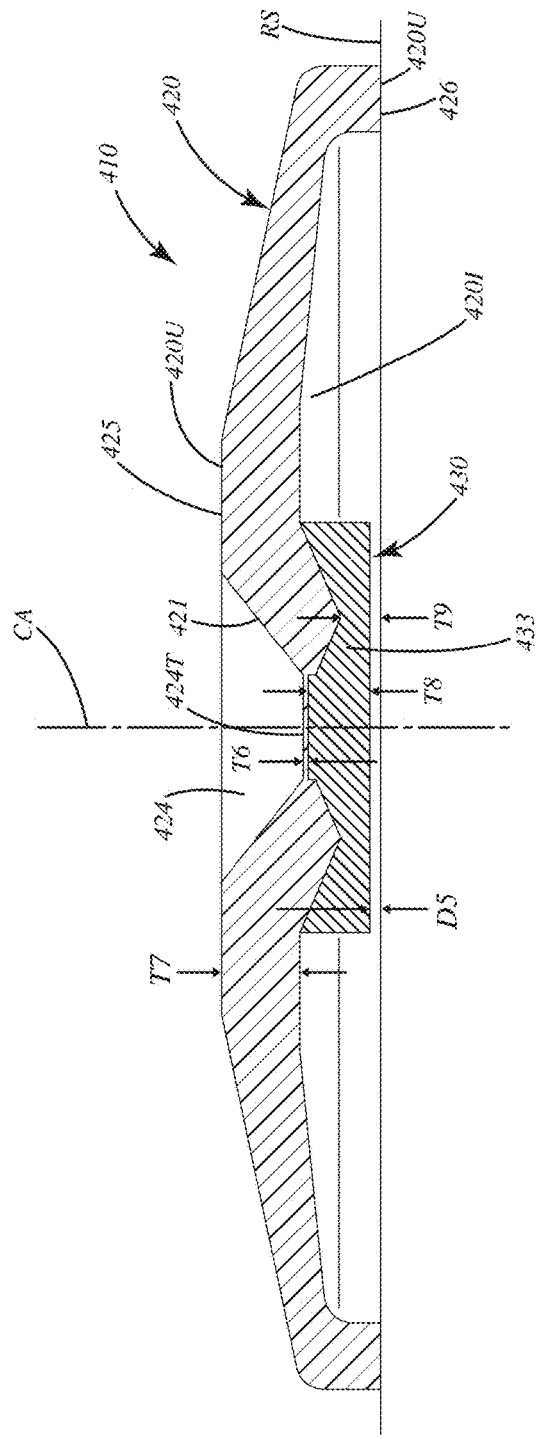
FIG. 26 is a section view thereof.

With further reference to FIG. 26, the sealing member 430 and particularly the secondary seal 433 thereof can be disposed under the recess 424 of the rigid cap 420. The sealing member also can have varying thicknesses as it extends radially outward from the central axis CA. For example, under the target region 424T, which can be of a lesser thickness T6 than the thickness T7 of the cap perimeter ring 425, the sealing member 430 can be of a greater thickness T8 than another thickness T9 of the sealing member disposed outwardly from the central axis CA. The thickness of the sealing member 430 can vary depending on the contours of the lower interior surface 4201 of the rigid cap 420 and the application.

The method of using the cap system 410 of this embodiment is virtually identical to that of the embodiment described above. Briefly, the cap system 410 can be in the form of a strip 420S, as shown in FIG. 27. The strip 420S can be advanced along or within a cap feeder 481, generally along a ramp 481R. The lowermost portion 420L and cap rim 426 of the rigid cap 420 can engage and slide along the reference surface RS, while the sealing member 430 remains a distance D6 removed from the reference surface RS so that its higher friction material does not impair the sliding or other movement of the caps along that surface. The hold down arm 481H can hold down the cap 420 and the cap rim 426 or cap lower surface 420L against the reference surface RS of the ramp 481 as the cap system 410 slides along the same. The hold down arm 481H also can engage the cap uppermost surface 420U of the rigid cap 420, without engaging any portion of the sealing member 430. Each individual cap 420 can be advanced to a driving station and penetrated by a fastener to be installed, similar to the embodiments described above.

Figure 28:
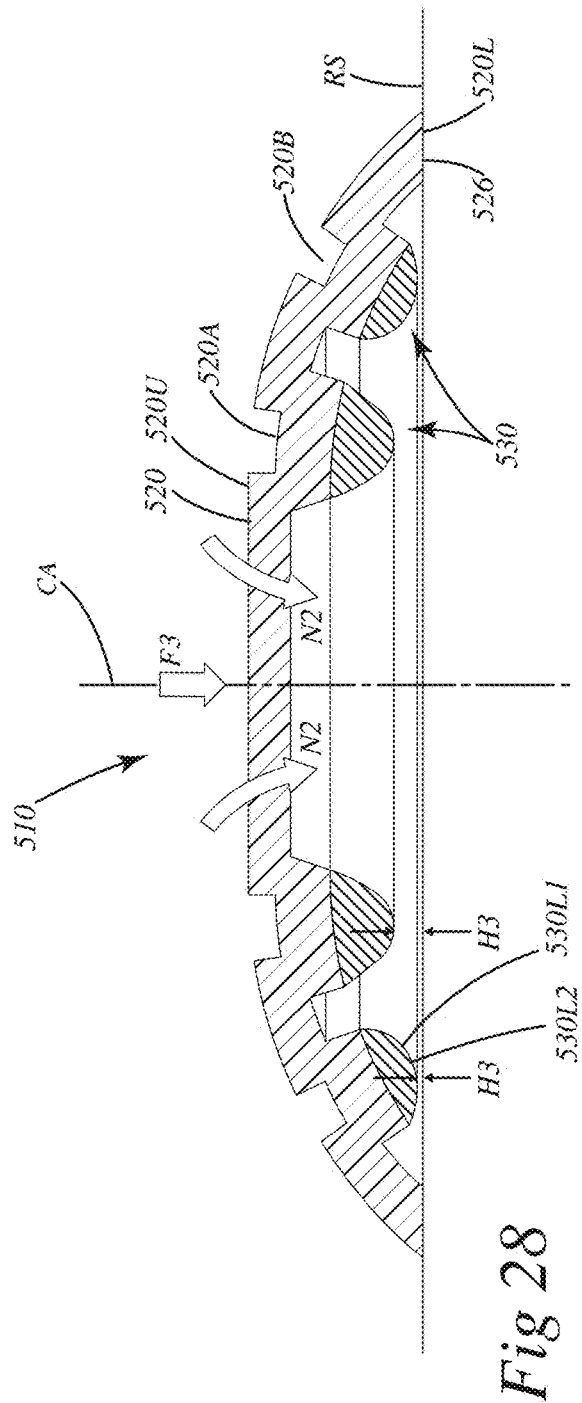
FIG. 28 is a side section view of a fastener cap system of a fifth alternative embodiment including flexing elements.

A fifth alternative embodiment of the fastener cap system is shown in FIG. 28 and generally designated 510. This fastener cap system 510 can be similar to the fastener cap systems 10, 110, 210, 310 and 410 described above in structure, function and operation with several exceptions. For example, this fastener cap system 510 can include a rigid cap 520 and a sealing member 530. The rigid cap can be incorporated into a strip of other rigid caps that are connected via cap connector tabs (not shown) that extend from and opposite and distal portions of the respective individual rigid caps. These connector tabs can be similar to the connector tabs 50, 51 and 52 as described above. In this embodiment, however, the rigid cap can include flexure grooves 520A and 520B which can be in the form of annular grooves about the central axis CA of the rigid cap 520. These flexure grooves can allow the cap rigid cap 522 easily flex inward in directions N2 when a force F3 is applied via a fastener (not shown). In turn, the sealing member 530 can move downward toward and engage the reference surface RS in an installed mode to form a water or liquid barrier as described above.

As shown, the sealing member 530 can include concentric sealing rings, each having a lowermost surface 530L1 and 530L2. These surfaces can be disposed distances D8 and D9, which can be different, from the reference surface RS in a pre-installation mode when the cap 510 is resting on or otherwise engages the reference surface RS. In this mode, the cap rim 526 and lowermost portion 520L can engage that reference surface RS. When the force F3 is applied in an installed mode, each of the lower surfaces 530L1 and 530L2 are moved toward and engage the reference surface RS, along with the lowermost surface 520L and cap rim 526 of the cap system 510. As with the embodiments above, this cap 510 can be included in strip form and fed via an installation tool along a cap feeder to a driving station where a fastener penetrates the cap system 510 to install individual caps sequentially, relative to a substrate and/or reference surface as described above.

Figure 29:
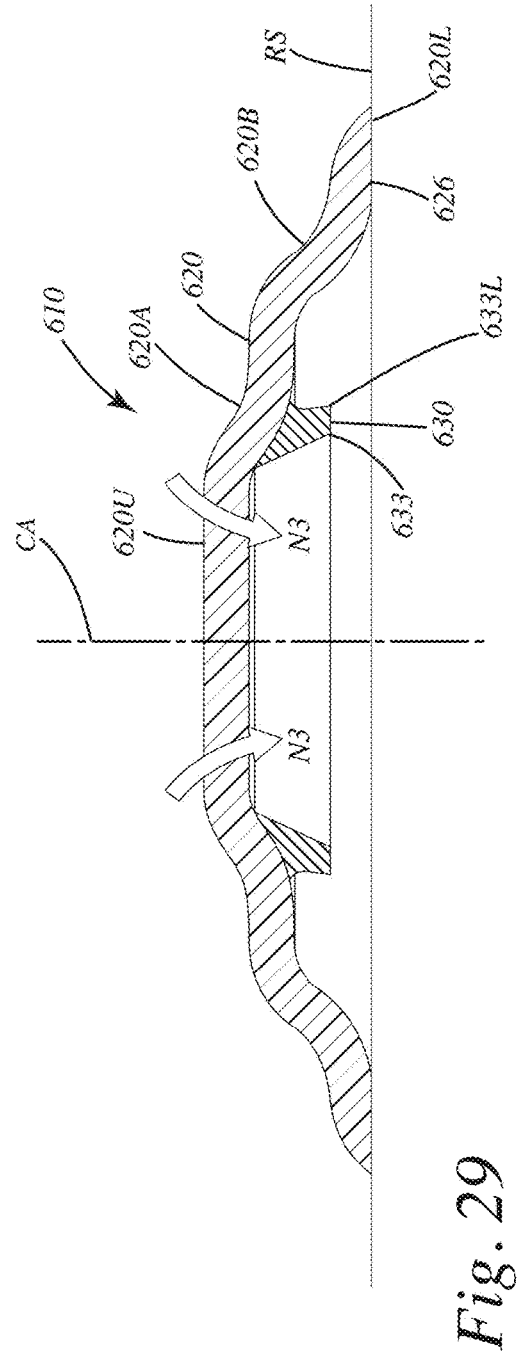
FIG. 29 is a side section view of a fastener cap system of a sixth alternative embodiment including flexing elements.

A sixth alternative embodiment of the fastener cap system is shown in FIG. 29 and generally designated 610. This fastener cap system 610 can be similar to the fastener cap systems 10, 110, 210, 310, 410 and 510 described above in structure, function and operation with several exceptions. For example, this fastener cap system 610 can include a rigid cap 620 and a sealing member 630. The rigid cap can be incorporated into a strip of other rigid caps that are connected via cap connector tabs (not shown) as described above. In this embodiment however, the rigid cap 620 can include one or more undulations or recesses 620A, 620B concentrically disposed around the central axis CA. Like the embodiment immediately above, this can allow the rigid cap 620 to flex inward in directions N3 when penetrated by a fastener such that the lowermost surface 633L of a secondary seal 633 of the seal member 630 can move downward and engage a reference surface RS in an installed mode. The method of using this cap system 610 in a cap feeder of an installation tool can be similar or identical to that described in the embodiments above. The sealing structure and function of this cap system also can be similar to that of the embodiments above when installed relative to a substrate with a fastener, and will not be described again here.

Figure 30:
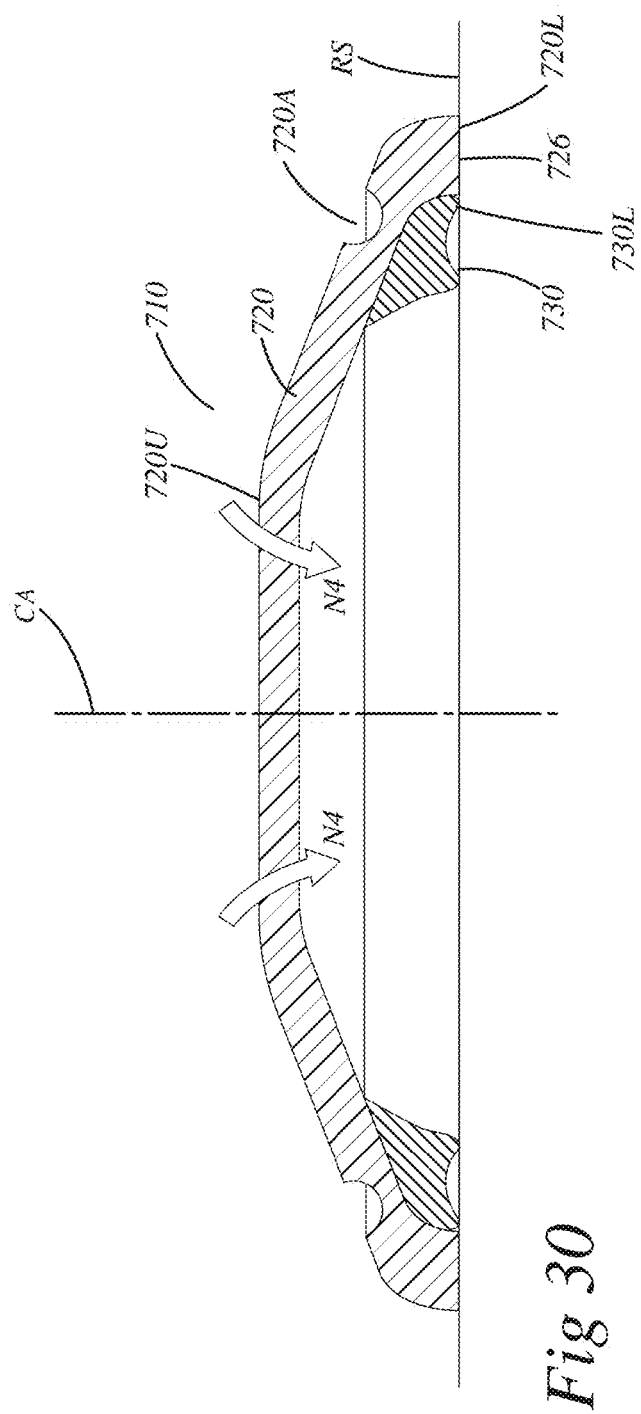
FIG. 30 is a side section view of a fastener cap system of a seventh alternative embodiment including flexing elements.

A seventh alternative embodiment of the fastener cap system is shown in FIG. 30 and generally designated 710. This fastener cap system 710 can be similar to the fastener cap systems 10, 110, 210, 310, 410, 510 and 610 described above in structure, function and operation with several exceptions. For example, this fastener cap system 710 can include a rigid cap 720 and a sealing member 730. The rigid cap can be incorporated into a strip of other rigid caps that are connected via cap connector tabs (not shown) as described above. In this embodiment however, the rigid cap 720 can include one or more flex grooves 720A disposed around the central axis CA. Like the embodiment immediately above, this can allow the rigid cap 720 to flex inward in directions N4 when penetrated by a fastener. In this embodiment, the sealing member 730 can be disposed outwardly, adjacent the cap rim 726 and lowermost surface 720L of the cap. Indeed, the lowermost surface 730L of the sealing member 730 can be disposed at the same level or plane as the cap lowermost surface 720L and the cap rim 726. Thus, even in the pre-installation mode, the lowermost surface 730L can engage the reference surface RS along with the cap rim 726 and lowermost portion 720L of the cap. The method of using this cap system 710 in a cap feeder of an installation tool can be similar or identical to that described in the embodiments above, with the exception of the sealing member 730 also engaging the reference surface of a ramp or other component of a cap feeder to potentially increase friction as the cap system 710 moves along the cap feeder within an installation tool. The sealing structure and function of this cap system also can be similar to that of the embodiments above when installed relative to a substrate with a fastener, and will not be described again here.

Figure 31:
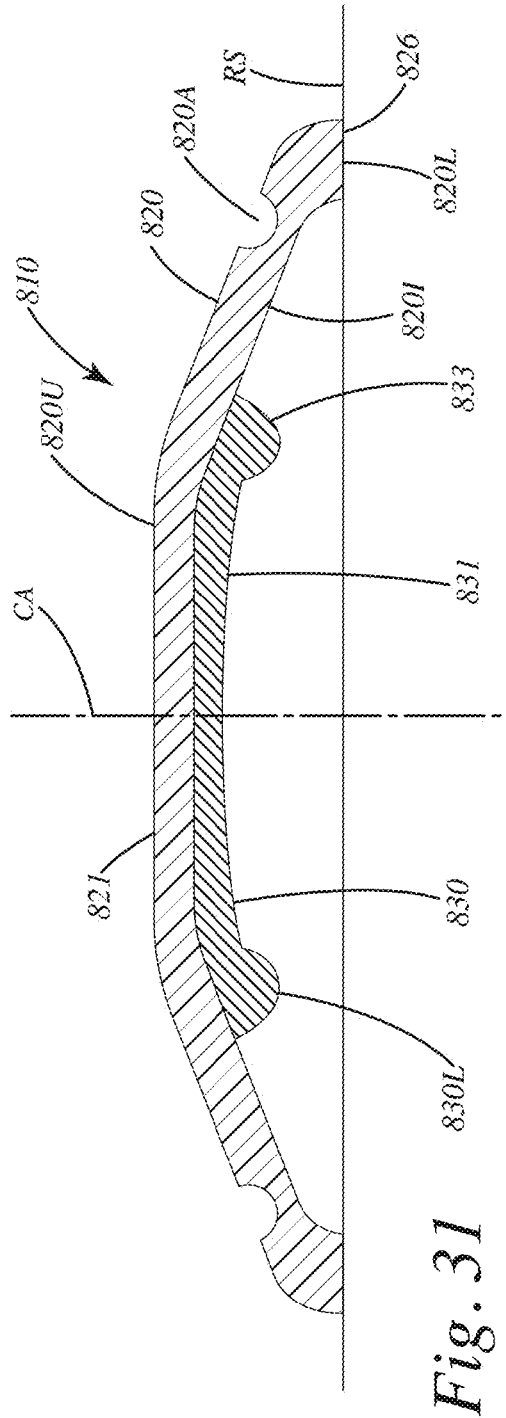
FIG. 31 is a side section view of a fastener cap system of an eighth alternative embodiment including flexing elements.

An eight alternative embodiment of the fastener cap system is shown in FIG. 31 and generally designated 810. This fastener cap system 810 can be similar to the fastener cap systems 10, 110, 210, 310, 410, 510, 610 and 710 described above in structure, function and operation with several exceptions. For example, this fastener cap system 810 can include a rigid cap 820 and a sealing member 830. The rigid cap can be incorporated into a strip of other rigid caps that are connected via cap connector tabs (not shown) as described above. The rigid cap 820 also can include one or more flex grooves 820A near the cap rim 826. The flex groove can allow the cap 820 to flex more easily in an installed mode. Further, this cap 820 can include a generally flat or slightly domed central portion 821 that extends radially outward from the central axis CA. In this embodiment, the sealing member 830 can be disposed on an interior lower surface 820I of the rigid cap 820. The sealing member 830 can include a central seal 831 that extends radially outward from the central axis CA and includes a downward extending secondary seal 833 which can be in the form of an annular ring. This annular ring can include a lowermost surface 830L that is disposed a distance above the level of the cap rim 826 and the lowermost surface 820L. The method of using this cap system 810 in a cap feeder of an installation tool can be similar or identical to that described in the embodiments above. The sealing structure and function of this cap system 810 also can be similar to that of the embodiments above when installed relative to a substrate with a fastener, and will not be described again here.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The following additional statements about other current embodiments are provided, the lettering of which is not to be construed as designating levels of importance.

Statement A. A fastener cap apparatus comprising: a rigid cap comprising: a central axis; an upper cap surface and an opposing lower cap surface; a central cap disc circumferentiating the central axis and extending outwardly therefrom to a cap perimeter flange; a cap perimeter ring joined with the cap perimeter flange, the cap perimeter ring including a cap rim; a first cap connector tab projecting outwardly from the cap rim; a second cap connector tab projecting outwardly from the cap rim distal and opposite the first cap connector tab; and a sealing member constructed from an elastomeric material and joined with the rigid cap, the sealing member comprising: a central seal disc circumferentiating the central axis and extending outwardly therefrom, the central seal disc disposed over and extending along the central cap disc, the central seal disc having an upper seal dimension greater than a head dimension of a head of a fastener configured to extend through the rigid cap and the sealing member, the central seal disc joined with the upper cap surface; a seal perimeter ring disposed on the cap lower surface and extending along the cap perimeter ring to a seal rim, the seal rim being disposed adjacent the cap rim and configured to engage a substrate and form a first liquid barrier around the rigid cap so that moisture is impaired from entering a first space under the rigid cap between the lower cap surface and the substrate.

Statement B. The apparatus of Statement A, wherein the rigid cap defines a first passageway extending through the rigid cap from the upper cap surface to the lower cap surface, wherein the central seal disc and the seal perimeter ring are joined via a first sprue extending through the first passageway, wherein the central seal disc, seal perimeter ring and first sprue form a one piece monolithic unit.

Statement C. The apparatus of any preceding statement, wherein the rigid cap defines a second passageway extending through the rigid cap from the upper cap surface to the lower cap surface, wherein the central seal disc and the seal perimeter ring are joined via a second sprue extending through the second passageway, wherein the central seal disc, seal perimeter ring and first sprue and second sprue form the one piece monolithic unit.

Statement D. The apparatus of any preceding statement, wherein the upper cap surface defines a recess centered on the central axis, wherein the central seal disc is disposed in the recess and directly joined with the central cap disc.

Statement E. The apparatus of any preceding statement, wherein the recess is bounded by a recess wall that curves around the central axis, wherein the central seal disc includes an outer seal disc wall that is disposed adjacent the recess wall, wherein the cap rim and the seal rim are disposed radially outward from the recess wall and outer seal disc wall.

Statement F. The apparatus of any preceding statement, comprising: a secondary seal ring disposed between the seal rim and the central axis, the secondary seal ring extending downwardly from the lower cap surface and configured to engage the substrate and form a second liquid barrier under the rigid cap so that moisture is impaired from entering a second space under the rigid cap between the secondary seal ring and the central axis.

Statement G. The apparatus of any preceding statement, wherein the secondary seal ring is an annular ring, wherein the annular ring is disposed below the central cap disc.

Statement H. The apparatus of any preceding statement, wherein the central seal disc covers the central cap disc on the upper cap surface, wherein the central seal disc is uncovered by the sealing member on the lower cap surface.

Statement I. The apparatus of any preceding statement, wherein the sealing member defines a central seal void aligned with the central cap disc, wherein the seal perimeter ring extends radially outward from the central seal void toward the seal rim.

Statement J. The apparatus of any preceding statement, wherein the sealing member includes a first seal connector tab projecting outwardly from the seal rim, the first seal connector tab being joined with the first cap connector tab; wherein the sealing member include a second seal connector tab projecting outwardly from the seal rim, the second seal connector tab being joined with the second cap connector tab distal and opposite the first seal connector tab.

Statement K. An apparatus comprising: a rigid cap comprising: a central cap disc extending to a downwardly extending cap perimeter flange; a cap perimeter ring joined with the cap perimeter flange, the cap perimeter ring including a cap rim; and a sealing member constructed from an elastomeric material and joined with the rigid cap, the sealing member comprising: a central seal disc disposed over the central cap disc, the central seal disc having an upper seal dimension greater than a head dimension of a head of a fastener configured to extend through the rigid cap and the sealing member; a seal perimeter ring extending along the cap perimeter ring to a seal rim, the seal rim being disposed adjacent the cap rim and configured to engage a substrate and form a first liquid barrier around the rigid cap so that moisture is impaired from entering a first space under the rigid cap between the lower cap surface and the substrate.

Statement L. The apparatus of any preceding statement, a secondary seal ring disposed between a seal rim and a central axis of the rigid cap, the secondary seal ring extending downwardly from the rigid cap and forming a second liquid barrier under the rigid cap so that moisture is impaired from entering a second space under the rigid cap between the secondary seal ring and the central axis.

Statement M. The apparatus of any preceding statement, wherein the secondary seal ring is an annular ring, wherein the annular ring is disposed below the central cap disc.

Statement N. The apparatus of any preceding statement, wherein the fastener extends through the central seal disc and the central cap disc, wherein the sealing member includes a secondary seal ring that extends downward from a lower cap surface of the rigid cap and circumferentiates the fastener but is distal from the fastener along the lower cap surface, wherein a central void is formed between the substrate and the lower cap surface under the central cap disc when the fastener and rigid cap are installed.

Statement O. The apparatus of any preceding statement, wherein an outer void is formed between the substrate and the seal perimeter ring under the cap perimeter flange, wherein the central void and the outer void are separated from one another by the secondary seal ring.

Statement P. The apparatus of any preceding statement, a first cap connector tab projecting outwardly from the cap rim; a second cap connector tab projecting outwardly from the cap rim distal and opposite the first cap connector tab; a first seal connector tab projecting outwardly from the seal rim, the first seal connector tab being joined with the first cap connector tab; and a second seal connector tab projecting outwardly from the seal rim, the second seal connector tab being joined with the second cap connector tab distal and opposite the first seal connector tab.

Statement Q. The apparatus of any preceding statement, wherein the rigid cap defines a first passageway extending through the rigid cap from an upper cap surface to the lower cap surface, wherein the central seal disc and the seal perimeter ring are joined via a first sprue extending through the first passageway, wherein the central seal disc, seal perimeter ring and first sprue form a one piece monolithic unit.

Statement R. A method comprising: forming a plurality of rigid caps, each rigid cap comprising a central cap disc extending to a cap perimeter flange, and a cap perimeter ring joined with the cap perimeter flange, the cap perimeter ring including a cap rim, each cap rim joined with an adjacent cap rim of an adjacent rigid cap via a cap connector; and joining a plurality of sealing members constructed from an elastomeric material with each of the respective plurality of rigid caps, each sealing member comprising a central seal disc disposed over the central cap disc, the central seal disc having an upper seal dimension greater than a head dimension of a head of a fastener configured to extend through the rigid cap and the sealing member, a seal perimeter ring extending along the cap perimeter ring to a seal rim, the seal rim being disposed adjacent the cap rim and configured to engage a substrate and form a first liquid barrier around the rigid cap so that moisture is impaired from entering a first space under the rigid cap between a lower cap surface and the substrate.

Statement S. The method of any preceding statement, comprising: introducing a flowable polymeric material into a mold to form the plurality of rigid caps in a plurality of corresponding cap mold cavities, the cap cavities being coextensive with one another and joined with respective cap connector cavities, such that the molten polymeric material flows through the respective cap connector cavities; allowing the flowable polymeric material to cure to form the plurality of rigid caps, with each of the plurality of rigid caps joined with an adjacent rigid cap via a respective cap connector; forming a plurality of corresponding sealing member cavities adjacent each of the plurality of rigid caps, the sealing member cavities being coextensive with one another and joined with respective seal connector cavities; introducing the elastomeric material in flowable form into the plurality of sealing member cavities adjacent each of the plurality of rigid caps and into the respective seal connector cavities adjacent respective cap connectors; allowing the elastomeric material to cure to form a plurality of sealing members on respective ones of the plurality of rigid caps, with each of the plurality of sealing members joined with an adjacent sealing member via a respective seal connector.

Statement T. The method of any preceding statement, comprising: coextruding a polymeric material to form the plurality of caps and the elastomeric material to form the plurality of sealing members joined with the plurality of caps in a strip.

It will be appreciated that by identifying or naming herein certain elements as first, second, third, etc., that does not require that there always be a certain number of elements preceding, succeeding, above, below, adjacent and/or near the numbered elements. Further, any one of a numbered group of elements, for example, a third element, alternatively can be referred to as a first, second, fourth or other numbered row element. The same is true for the naming of any other elements in the form of a first element, second element, third element, etc. as used herein.

Although the different elements and assemblies of the embodiments are described herein as having certain functional characteristics, each element and/or its relation to other elements can be depicted or oriented in a variety of different aesthetic configurations, which support the ornamental and aesthetic aspects of the same. Simply because an apparatus, element or assembly of one or more of elements is described herein as having a function does not mean its orientation, layout or configuration is not aesthetic and ornamental in nature.

In addition, when a component, part or layer is referred to as being "joined with," "on," "engaged with," "adhered to," "secured to," or "coupled to" another component, part or layer, it may be directly joined with, on, engaged with, adhered to, secured to, or coupled to the other component, part or layer, or any number of intervening components, parts or layers may be present. In contrast, when an element is referred to as being "directly joined with," "directly on," "directly engaged with," "directly adhered to," "directly secured to," or "directly coupled to" another element or layer, there may be no intervening elements or layers present. Other words used to describe the relationship between components, layers and parts should be interpreted in a like manner, such as "adjacent" versus "directly adjacent" and similar words. As used herein, the term "and/or" includes any and all combinations of one or more of the associated listed items.

The above description is that of current embodiments of the invention. Various alterations and changes can be made without departing from the broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, any combination of X, Y and Z, for example, X, Y, Z; X, Y; X, Z; Y, Z, and/or any other possible combination together or alone of those elements, noting that the same is open ended and can include other elements.

What is claimed is:

1. A method of using a fastener cap system, the method comprising:
   moving a plurality of rigid caps sequentially along a cap feeder toward a driving station such that at least one of a cap lowermost surface and a cap uppermost surface of a first rigid cap slidably engages the cap feeder,
   wherein the first rigid cap includes a sealing member and the first rigid cap slidably engages a cap lowermost surface with a ramp of the cap feeder, without the sealing member extending downward from the first rigid cap and engaging the cap feeder, in a pre-installation mode, as the plurality of rigid caps move along the cap feeder.

2. The method of claim 1,
   wherein the first rigid cap includes the cap uppermost surface and the cap lowermost surface,
   wherein the sealing member includes a sealing member lower surface that is disposed above the cap lowermost surface in the pre-installation mode and at the same level as the cap lowermost surface in an installed mode in which a fastener engages the first rigid cap with a substrate.

3. The method of claim 1,
wherein the sealing member extending downward from the first rigid cap does not engage and is set a first distance from the ramp in the pre-installation mode as the first rigid cap moves along the cap feeder.

4. The method of claim 3,
wherein the first distance is less than a first thickness of the rigid cap.

5. The method of claim 3 comprising:
piercing the sealing member with a first fastener; and
pushing the sealing member into engagement with a substrate so that a lowermost surface of the sealing member moves the first distance in an installation mode.

6. The method of claim 1,
wherein the first rigid cap includes another sealing member disposed concentrically outward from the sealing member,
wherein the another sealing member is distal from the ramp in the pre-installation mode.

7. The method of claim 6,
wherein the sealing member and the another sealing member are different distances from the ramp as the first rigid cap traverses the cap feeder.

8. The method of claim 1,
wherein the sealing member includes a flat, planar lower surface that is distal from and moves adjacent the ramp in the pre-installation mode.

9. The method of claim 1,
wherein the sealing member includes a ring and a planar portion,
wherein the planar portion is pierced by a fastener in an installation mode.

10. The method of claim 9,
wherein the ring moves toward a substate during the installation mode as the fastener pierces the planar portion of the sealing member.

11. A method of using a fastener cap system, the method comprising:
moving a first rigid cap along a cap feeder, the first rigid cap including a sealing member constructed from an elastomeric material; and
engaging a cap lowermost surface of the first rigid cap slidably with a ramp of the cap feeder, without the sealing member extending downward from the first rigid cap and engaging the cap feeder, in a pre-installation mode, as the first rigid cap moves along the cap feeder.

12. The method of claim 11,
wherein the first rigid cap includes another sealing member disposed concentrically outward from the sealing member, wherein the another other sealing member is distal from the ramp in the pre-installation mode.

13. The method of claim 12,
wherein the sealing member and the another sealing member are different distances from the ramp as the first rigid cap traverses the cap feeder.

14. A method of using a fastener cap system, the method comprising:
moving a first rigid cap along a cap feeder, the first rigid cap including a sealing member; and
engaging a cap lowermost surface of the first rigid cap slidably with a ramp of the cap feeder, without the sealing member extending downward from the first rigid cap and engaging the cap feeder, in a pre-installation mode, as the first rigid cap moves along the cap feeder,
wherein the sealing member includes a sealing member lower surface that is disposed above the cap lowermost surface in the pre-installation mode and at the same level as the cap lowermost surface in an installed mod in which a fastener engages the first rigid cap with a substrate.

15. A method of using a fastener cap system, the method comprising:
moving a first rigid cap along a cap feeder, the first rigid cap including a sealing member; and
engaging a cap lowermost surface of the first rigid cap slidably with a ramp of the cap feeder, without the sealing member extending downward from the first rigid cap and engaging the cap feeder, in a pre-installation mode, as the first rigid cap moves along the cap feeder,
wherein the sealing member is set a first distance from the ramp in the pre-installation mode.

16. The method of claim 15,
wherein the first distance is less than a first thickness of the rigid cap.

17. The method of claim 15 comprising:
piercing the sealing member with a first fastener; and
pushing the sealing member into engagement with a substrate so that a lowermost surface of the sealing member moves the first distance in an installation mode.

18. A method of using a fastener cap system, the method comprising:
moving a first rigid cap along a cap feeder, the first rigid cap including a sealing member; and
engaging a cap lowermost surface of the first rigid cap slidably with a ramp of the cap feeder, without the sealing member extending downward from the first rigid cap and engaging the cap feeder, in a pre-installation mode, as the first rigid cap moves along the cap feeder,
wherein the sealing member includes a flat, planar lower surface that is distal from and moves along the ramp in the pre-installation mode.

19. A method of using a fastener cap system, the method comprising:
moving a first rigid cap along a cap feeder, the first rigid cap including a sealing member; and
engaging a cap lowermost surface of the first rigid cap slidably with a ramp of the cap feeder, without the sealing member extending downward from the first rigid cap and engaging the cap feeder, in a pre-installation mode, as the first rigid cap moves along the cap feeder,
wherein the sealing member includes a ring and a planar portion,
wherein the planar portion is pierced by a fastener in an installation mode.

20. The method of claim 19,
wherein the ring moves toward a substrate during the installation mode as the fastener pierces the planar portion of the sealing member.

* * * * *